United States Patent
Nakamura et al.

(10) Patent No.: US 12,512,268 B2
(45) Date of Patent: Dec. 30, 2025

(54) METHOD OF MAKING A MULTILAYER CERAMIC ELECTRONIC DEVICE

(71) Applicant: TAIYO YUDEN CO., LTD., Tokyo (JP)

(72) Inventors: Tomoaki Nakamura, Tokyo (JP); Mikio Tahara, Tokyo (JP); Yasutomo Suga, Tokyo (JP); Tetsuhiko Fukuoka, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 660 days.

(21) Appl. No.: 17/736,918

(22) Filed: May 4, 2022

(65) Prior Publication Data

US 2022/0262572 A1 Aug. 18, 2022

Related U.S. Application Data

(62) Division of application No. 16/945,260, filed on Jul. 31, 2020, now abandoned.

(30) Foreign Application Priority Data

Jul. 31, 2019 (JP) .................................. 2019-141794

(51) Int. Cl.
*H01G 4/30* (2006.01)
*H01G 2/06* (2006.01)
(Continued)

(52) U.S. Cl.
CPC .............. *H01G 4/30* (2013.01); *H01G 2/065* (2013.01); *H01G 4/008* (2013.01); *H01G 4/012* (2013.01); *H01G 4/1218* (2013.01)

(58) Field of Classification Search
CPC ............ C12N 15/8245; C12N 15/8257; C12N 9/1051; H01G 2/065; H01G 4/008;
(Continued)

(56) References Cited

U.S. PATENT DOCUMENTS

| | | |
|---|---|---|
| 2014/0166351 A1 | 6/2014 | Lee et al. |
| 2015/0075854 A1 | 3/2015 | You et al. |
| 2015/0325377 A1 | 11/2015 | Takeuchi et al. |
| 2016/0133384 A1 | 5/2016 | Park et al. |

(Continued)

FOREIGN PATENT DOCUMENTS

| | | |
|---|---|---|
| CN | 104465085 A | 3/2015 |
| CN | 105097277 A | 11/2015 |

(Continued)

OTHER PUBLICATIONS

Japanese Office Action dated Oct. 3, 2023 in a counterpart Japanese patent application No. 2019-141794. A machine translation (not reviewed for accuracy) attached.).

(Continued)

*Primary Examiner* — Minh N Trinh

(74) *Attorney, Agent, or Firm* — CHEN YOSHIMURA LLP

(57) ABSTRACT

A multilayer ceramic electronic device includes a ceramic main body and a pair of external electrodes respectively covering a pair of end surfaces of the ceramic main body, wherein the ceramic main body includes a laminated body including a plurality of internal electrodes laminated vertically therein, and a pair of side margin parts respectively covering a pair of side surfaces of the laminated body, and wherein a distance between a bottom surface of the ceramic main body and the bottommost internal electrode is greater than a distance between the top surface of the ceramic main body and the topmost internal electrode.

7 Claims, 22 Drawing Sheets

(51) Int. Cl.
*H01G 4/008* (2006.01)
*H01G 4/012* (2006.01)
*H01G 4/12* (2006.01)

(58) Field of Classification Search
CPC ........ H01G 4/012; H01G 4/12; H01G 4/1218; H01G 4/224; H01G 4/30
See application file for complete search history.

(56) References Cited

U.S. PATENT DOCUMENTS

| | | |
|---|---|---|
| 2016/0284471 A1 | 9/2016 | Mizuno et al. |
| 2017/0092424 A1 | 3/2017 | Morito et al. |
| 2017/0213647 A1 | 7/2017 | Ahn |
| 2017/0213649 A1 | 7/2017 | Kato et al. |
| 2017/0367187 A1 | 12/2017 | Chae et al. |
| 2018/0174757 A1 | 6/2018 | Kim et al. |
| 2020/0082985 A1* | 3/2020 | Suga ................... H01G 4/2325 |
| 2022/0262572 A1* | 8/2022 | Nakamura ........... H01G 4/1218 |

FOREIGN PATENT DOCUMENTS

| | | |
|---|---|---|
| JP | 2012-230959 A | 11/2012 |
| JP | 2015-061074 A | 3/2015 |
| JP | 2015-228481 A | 12/2015 |
| JP | 2017-069417 A | 4/2017 |
| JP | 2017-135177 A | 8/2017 |
| JP | 2019-106528 A | 6/2019 |
| JP | 2019-117817 A | 7/2019 |

OTHER PUBLICATIONS

Japanese Office Action dated Apr. 4, 2023, in a counterpart Japanese patent application No. 2019-141794. (A machine translation (not reviewed for accuracy) attached.).

Chinese Office Action dated Jan. 30, 2024 in a counterpart Chinese patent application No. 202010743562.0. (A machine translation (not reviewed for accuracy) attached.).

* cited by examiner

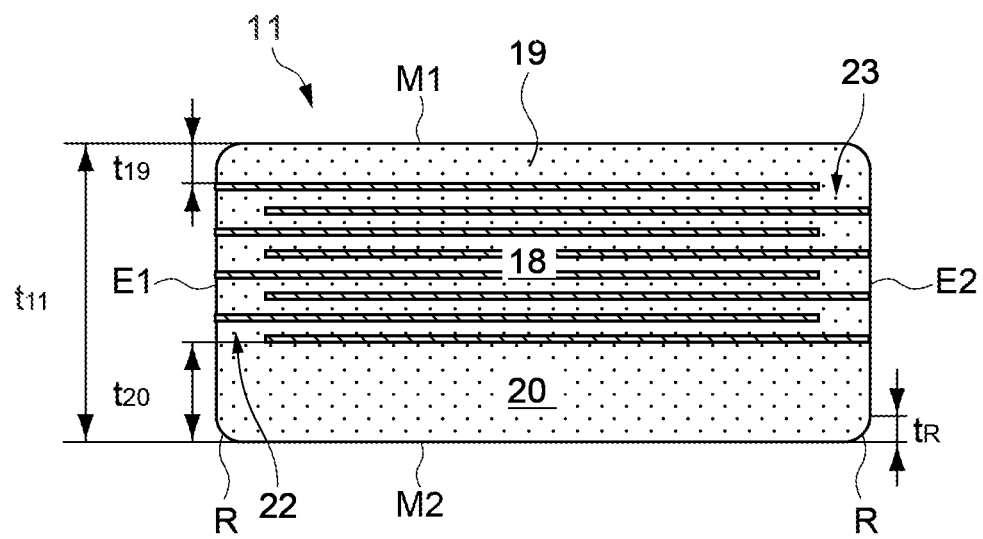
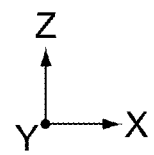
FIG. 6

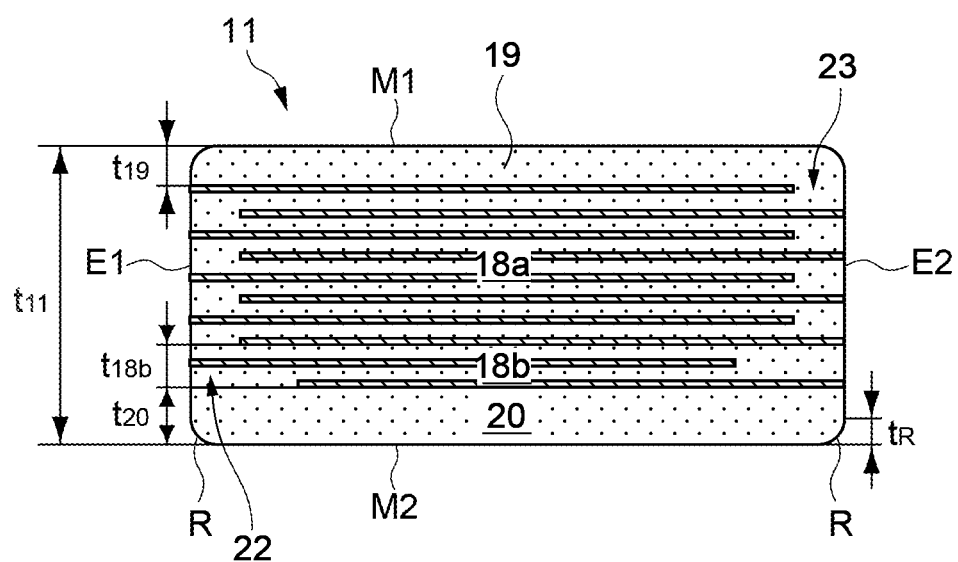
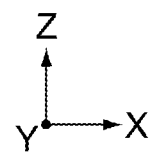
FIG. 17

METHOD OF MAKING A MULTILAYER CERAMIC ELECTRONIC DEVICE

BACKGROUND OF THE INVENTION

Technical Field

The present invention relates to a multilayer ceramic electronic device in which side margin parts are formed at a relatively later stage of the manufacture and a component mounting substrate mounting the same, and in particular to a method for making the same.

Background Art

In multilayer ceramic capacitors, protective parts are provided to protect the periphery of internal electrodes. In order to miniaturize a multilayer ceramic capacitor and make its capacitance larger, it is preferable to make as small as possible the protective parts, which do not contribute to the formation of the capacitance. Patent Document 1 discloses a technique to thin the protective parts.

In the manufacture method disclosed in Patent Document 1, laminated sheets, in which ceramic sheets having internal electrodes printed thereon are laminated, are cut to form a plurality of laminated bodies each having cut surfaces as the side surfaces that expose edges of internal electrodes, and a separate ceramic sheets is punched out by the side surfaces of the laminated body so as to form the protective parts on the side surfaces of each laminated body.

RELATED ART DOCUMENT

Patent Document

Patent Document 1: Japanese Patent Application Laid-Open Publication No. 2012-230959

SUMMARY OF THE INVENTION

Often times, a solder used to mount multilayer ceramic capacitors contains fluxes, which promote moisture contamination or hydrogen generation and cause corrosion of the ceramic main body. In the multilayer ceramic capacitors mounted using such a solder, when the corrosion due to the fluxes progresses to an internal electrode facing region in which internal electrodes face each other, insulation between the internal electrodes may be degraded, and a short circuit may occur.

In view of the foregoing, the present invention aims to provide a multilayer ceramic capacitor and a component mounting substrate having a high reliability.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a method of making a multilayer ceramic electronic device, comprising: forming a ceramic main body having a first main surface facing a first direction, a second main surface facing a direction opposite to the first direction, a pair of side surfaces respectively facing a second direction that is perpendicular to the first direction and a direction opposite to the second direction, and a pair of end surfaces respectively facing a third direction that is perpendicular to the first and second directions and a direction opposite to the third direction; and forming a pair of external electrodes respectively covering the pair of end surfaces, the pair of external electrodes respectively extending from the end surfaces to the second main surface, wherein the forming of the ceramic main body includes: forming a laminated body having a first cover part forming the first main surface, a second cover part forming the second main surface, and a plurality of internal electrodes laminated in the first direction, disposed between the first cover part and the second cover part by laminating a plurality of ceramic sheets in the first direction to form a laminate and by cutting both sides of the laminate to expose side ends of at least some of the internal electrodes at a pair of cut side surfaces of the laminated body; and thereafter, attaching a pair of side margin parts respectively to the pair of cut side surfaces of the laminated body that respectively face the second direction and the direction opposite to the second direction, the pair of side margin parts forming the pair of side surfaces of the ceramic main body, and wherein the forming of the laminated body is performed such that in the resulting ceramic main body, a distance, along the first direction, between the second main surface and the internal electrode that is the closest to the second main surface among the plurality of the internal electrodes is greater than a distance, along the first direction, between the first main surface and the internal electrode that is the closest to the first main surface among the plurality of the internal electrodes.

In another aspect, the present disclosure provides a method of making a multilayer ceramic electronic device, comprising: forming a ceramic main body having a first main surface facing a first direction, a second main surface facing a direction opposite to the first direction, a pair of side surfaces respectively facing a second direction that is perpendicular to the first direction and a direction opposite to the second direction, and a pair of end surfaces respectively facing a third direction that is perpendicular to the first and second directions and a direction opposite to the third direction, the ceramic main body including a laminated body and a pair of side margin parts; and forming a pair of external electrodes respectively covering the pair of end surfaces, the pair of external electrodes respectively extending from the end surfaces to the second main surface, wherein the laminated body of the ceramic main body includes: a first cover part forming the first main surface; a second cover part forming the second main surface; a plurality of first internal electrodes; and a plurality of second internal electrodes, wherein the plurality of first internal electrodes are laminated in the first direction, disposed between the first cover part and the second cover part, and in a plan view as seen from the direction opposite to the first direction, each of overlap areas between the plurality of first internal electrodes has a same shape and same dimensions, wherein the plurality of second internal electrodes are laminated in the first direction, disposed between the plurality of first internal electrodes and the second cover part, and in said plan view, along at least one of the second and third directions, each of overlap areas between the plurality of second internal electrodes is positioned inside said overlap areas between the plurality of first electrodes, wherein said pair of side margin parts of the laminated body respectively cover a pair of side surfaces of the laminated body that respectively face the second direction and the direction opposite to the second direction, the pair of side margin parts forming the pair of side surfaces of the ceramic main body, and wherein the forming of the ceramic body includes: forming the laminated body by laminating a plurality of ceramic sheets in the first direction to form a laminate and by cutting both sides of the laminate to expose side ends of at least some of the first internal electrodes at the pair of the side surfaces of the laminated; body and thereafter, attaching the pair of side margin parts respectively to the pair of side surfaces of the laminated body.

In another aspect, the present disclosure provides a multilayer ceramic electronic device, comprising: a ceramic main body having a first main surface facing a first direction, a second main surface facing a direction opposite to the first direction, a pair of side surfaces respectively facing a second direction that is perpendicular to the first direction and a direction opposite to the second direction, and a pair of end surfaces respectively facing a third direction that is perpendicular to the first and second directions and a direction opposite to the third direction; and a pair of external electrodes respectively covering the pair of end surfaces, the pair of external electrodes respectively extending from the end surfaces to the second main surface, wherein the ceramic main body includes: a laminated body having a first cover part forming the first main surface, a second cover part forming the second main surface, and a plurality of internal electrodes laminated in the first direction, disposed between the first cover part and the second cover part; and a pair of side margin parts respectively covering a pair of side surfaces of the laminated body that respectively face the second direction and the direction opposite to the second direction, the pair of side margin parts forming the pair of side surfaces of the ceramic main body, and wherein a distance, along the first direction, between the second main surface and the internal electrode that is the closest to the second main surface among the plurality of the internal electrodes is greater than a distance, along the first direction, between the first main surface and the internal electrode that is the closest to the first main surface among the plurality of the internal electrodes.

In the above-mentioned multilayer ceramic electronic device, in the ceramic main body, each of ridge parts that connect the second main surface to the pair of the side surfaces and the pair of the end surfaces of the ceramic main body may be chamfered, and said distance, along the first direction, between the second main surface and the internal electrode that is the closest to the second main surface among the plurality of the internal electrodes may be equal to or greater than 2.5 times as large as a dimension, along the first direction, of chamfered parts of the ridge parts.

In another aspect, the present disclosure provides a multilayer ceramic electronic device, comprising: a ceramic main body having a first main surface facing a first direction, a second main surface facing a direction opposite to the first direction, a pair of side surfaces respectively facing a second direction that is perpendicular to the first direction and a direction opposite to the second direction, and a pair of end surfaces respectively facing a third direction that is perpendicular to the first and second directions and a direction opposite to the third direction, the ceramic main body including a laminated body and a pair of side margin parts; and a pair of external electrodes respectively covering the pair of end surfaces, the pair of external electrodes respectively extending from the end surfaces to the second main surface, wherein the laminated body of the ceramic main body includes: a first cover part forming the first main surface; a second cover part forming the second main surface; a plurality of first internal electrodes; and a plurality of second internal electrodes, wherein the plurality of first internal electrodes are laminated in the first direction, disposed between the first cover part and the second cover part, and in a plan view as seen from the direction opposite to the first direction, each of overlap areas between the plurality of first internal electrodes has a same shape and same dimensions, wherein the plurality of second internal electrodes are laminated in the first direction, disposed between the plurality of first internal electrodes and the second cover part, and in said plan view, along at least one of the second and third directions, each of overlap areas between the plurality of second internal electrodes is positioned inside said overlap areas between the plurality of first electrodes, and wherein said pair of side margin parts of the laminated body respectively cover a pair of side surfaces of the laminated body that respectively face the second direction and the direction opposite to the second direction, the pair of side margin parts forming the pair of side surfaces of the ceramic main body.

In the above-mentioned multilayer ceramic electronic device, lateral edges, along the second direction, of the plurality of first internal electrodes may be positioned on the pair of side surfaces of the laminated body, and lateral edges, along the second direction, of the plurality of second internal electrodes may be positioned on inner sides of the pair of side surfaces of the laminated body.

In the above-mentioned multilayer ceramic electronic device, in said plan view, a dimension of the overlap areas between the plurality of second internal electrodes along the third direction may be smaller than a dimension of the overlap areas between the plurality of first electrodes along the third direction.

In the above-mentioned multilayer ceramic electronic device, the pair of external electrodes may respectively extend from the pair of end surfaces to the pair of side surfaces of the ceramic main body.

In the above-mentioned multilayer ceramic electronic device, lateral edges, along the second direction, of the plurality of first internal electrodes and lateral edges, along the second direction, of the plurality of second internal electrodes may be both positioned on the pair of side surfaces of the laminated body, and in said plan view, a dimension of the overlap areas between the plurality of second internal electrodes along the third direction may be smaller than a dimension of the overlap areas between the plurality of first electrodes along the third direction.

In the above-mentioned multilayer ceramic electronic device, the pair of external electrodes may not extend from the end surfaces to the pair of side surfaces.

In the above-mentioned multilayer ceramic electronic device, a distance, along the first direction, between the second main surface and the first internal electrode that is the closest to the second main surface among the plurality of the first internal electrodes may be greater than a distance, along the first direction, between the first main surface and the first internal electrode that is the closest to the first main surface among the plurality of the first internal electrodes.

In another aspect, the present disclosure provides a component mount substrate, comprising: the multilayer ceramic electronic device described above; a circuit substrate having a mounting surface that faces the second main surface of the multilayer ceramic electronic device and a pair of electrodes pads on the mounting surface; and solders that comment the pair of the external electrodes of the multilayer ceramic electronic device to the pair of electrode pads, respectively.

According to one or more aspects of the present invention described above, corrosion due to fluxes contained in the solders that are used for mounting the multilayer ceramic electronic device is unlikely to progress and reach an internal electrode facing part in which internal electrodes face each other in the ceramic main body. Therefore, a highly reliable multilayer ceramic electronic device and a component mounting substrate having a high reliability can be obtained.

It is to be understood that both the foregoing general description and the following detailed description are exemplary and explanatory, and are intended to provide further explanation of the invention as claimed.

BRIEF DESCRIPTION OF THE DRAWINGS

FIG. 6 is a cross-sectional view of a ceramic main body of the above-mentioned multilayer ceramic capacitor.

FIG. 17 is a cross-sectional view of a ceramic main body of the multilayer ceramic capacitor of Embodiment 2.

DETAILED DESCRIPTION OF EMBODIMENTS

Figure 1:
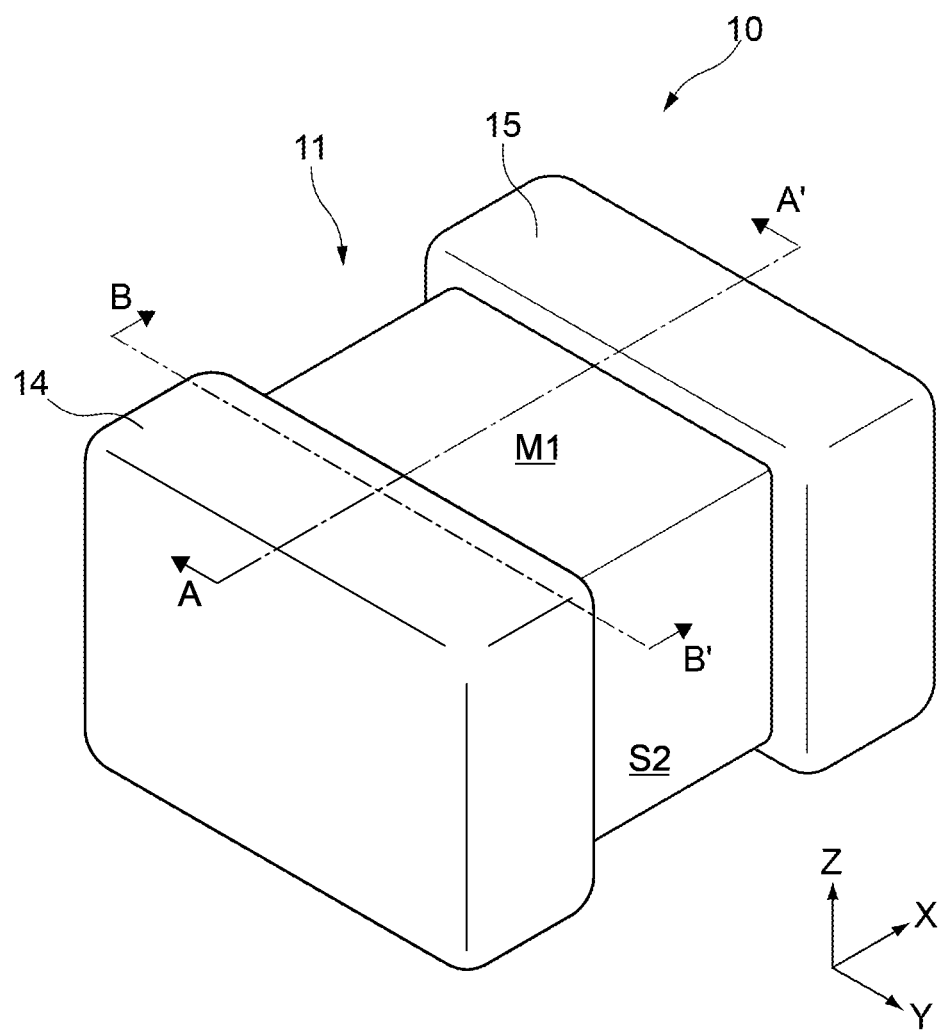
FIG. 1 is a perspective view of a multilayer ceramic capacitor according to Embodiment 1 of the present invention.

Embodiments of the present invention will be described with reference to the drawings. In the drawings, the X-axis, Y-axis, and the Z-axis that are orthogonal to each other are shown when appropriate. The orientations of these axes are the same among the drawings.

Embodiment 1

<Overall Structure of Multilayer Ceramic Capacitor 10>

Figure 2:
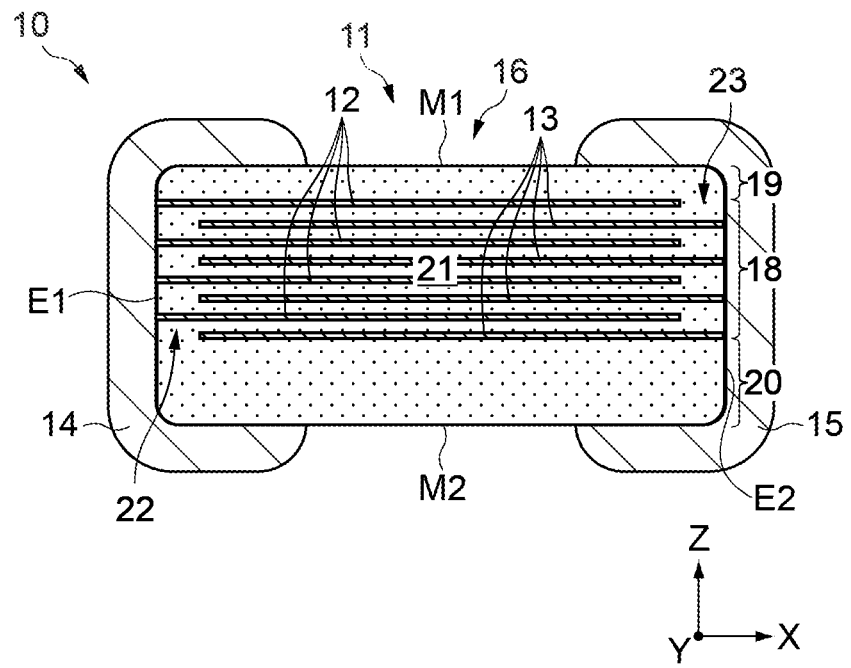
FIG. 2 is a cross-sectional view of the multilayer ceramic capacitor of FIG. 1 taken along the line A-A' of FIG. 1.
Figure 3:
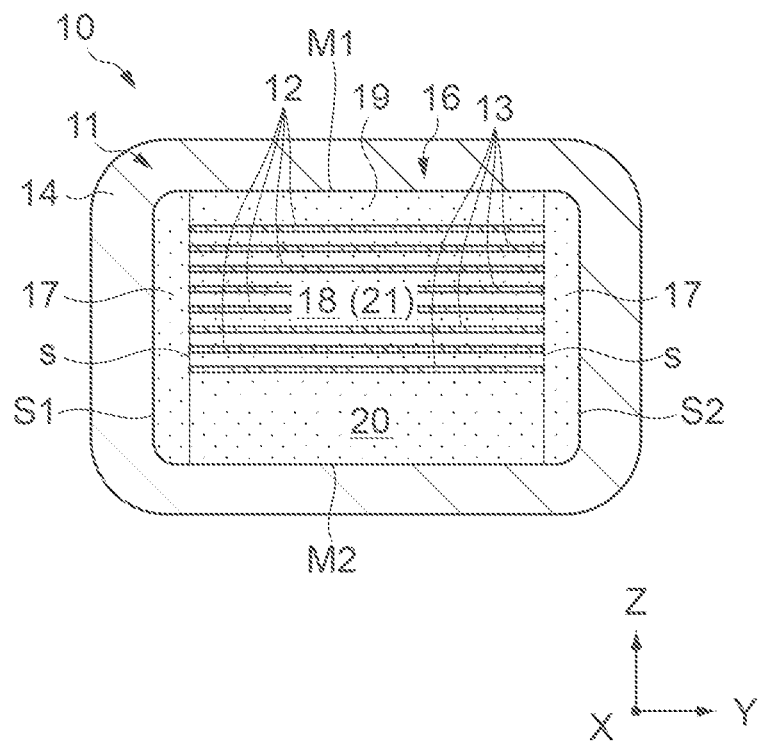
FIG. 3 is a cross-sectional view of the multilayer ceramic capacitor of FIG. 1 taken along the line B-B' of FIG. 1.

FIGS. 1-3 are drawings showing a multilayer ceramic capacitor 10 according to Embodiment 1 of the present invention. FIG. 1 is a perspective view of the multilayer ceramic capacitor 10. FIG. 2 is a cross-sectional view of the multilayer ceramic capacitor 10 taken along the line A-A' of FIG. 1.

FIG. 3 is a cross-sectional view of the multilayer ceramic capacitor 10 taken along the line B-B' of FIG. 1.

The multilayer ceramic capacitor 10 includes a ceramic main body 11, a first external electrode 14, and a second external electrode 15. The ceramic main body 11 is structured as a hexahedron having a first end surface E1 facing the negative X-direction, a second end surface E2 facing the positive X-direction, a first side surface S1 facing the negative Y-direction, a second side surface S2 facing the positive Y-direction, a first main surface M1 facing the positive Z-direction, and a second main surface M2 facing the negative Z-direction.

The external electrodes 14 and 15 respectively cover the end surfaces E1 and E2 of the ceramic main body 11, and respectively extend from the end surfaces E1 and E2 to the main surfaces M1 and M2 and to the side surfaces S1 and S2 such that they are separated from each other with spaces in between along the X-axis. Because of this, each of the external electrodes 14 and 15 has a U-shape in both cross sections parallel to the X-Z plane and parallel to the X-Y plane.

The external electrodes 14 and 15 are made of a good electrically conductive material. Such a material may be a metal material having copper (Cu), nickel (Ni), tin (Sn), palladium (Pd), platinum (Pt), silver (Ag), or gold (Au) as its main component, or an alloy of these materials.

The ceramic main body 11 is made of a ceramic dielectric and includes a laminated body 16 and side margin parts 17. The laminated body 16 has a pair of side surfaces s opposite to each other along the Y-axis. The laminated body 15 also has a pair of end surfaces that respectively constitute parts of the side surfaces E1 and E2 of the ceramic main body 11, and a pair of main surfaces that respectively constitute parts of the main surfaces M1 and M2 of the ceramic main body 11.

The laminated body 16 is structured such that a plurality of ceramic layers each having a sheet shape extending along the X-Y plane are laminated in the Z-direction. The laminated body 16 has a first cover part 19 forming the first main surface M1, a second cover part 20 forming the second main surface M2, and a functional part 18 arranged between the first cover part 19 and the second cover part 20.

The functional part 18 includes first and second internal electrodes 12 and 13, each having a sheet shape extending along the X-Y plane, laminated in the Z-direction. The internal electrodes 12 and 13 are arranged alternately with a plurality of ceramic layers in between in the Z-direction. The functional part 18 has an internal electrode facing part 21 and a first end margin part 22, and a second end margin part 23.

In the internal electrode facing part 21, the internal electrodes 12 and 13 overlap with each other; i.e., the internal electrodes 12 and 13 face each other with the ceramic layers in between along the Z-axis. The overlap areas of the plurality of internal electrodes 12 and 13 have the same shape and dimensions in this embodiment. The end margin parts 22 and 23 are provided on both sides, along the X-axis, of the internal electrode facing part 21, and respectively form parts of the end surfaces E1 and E2 of the ceramic main body 11. In the end margin parts 22 and 23, only one of the internal electrodes 12 and 13 are disposed.

More specifically, in the first end margin part 22, only the first internal electrodes 12 extend to the first end surfaced E1 and are connected to the first external electrode 14 at the first end surface E1. On the other hand, the second internal electrodes 13 are spaced from the first end surfaced E1 via the first end margin part 22, and are therefore insulated from the first external electrode 14.

In the second end margin part 23, only the second internal electrodes 13 extend to the second end surfaced E2 and are connected to the second external electrode 15 at the second end surface E2. On the other hand, the first internal electrodes 12 are spaced from the second end surfaced E2 via the second end margin part 23, and are therefore insulated from the second external electrode 15.

With this structure, in the functional part 18, voltage applied between the external electrodes 14 and 15 is applied to each of the ceramic layers between the internal electrodes 12 and 13. This way, in the multilayer ceramic capacitor 10, the function of storing charges corresponding the voltage applied between the external electrodes 14 and 15 can be realized by the functional part 18.

The internal electrodes 12 and 13 are formed to span the entire width of the functional part 18 along the Y-axis. That is, the respective edges, along the Y-axis, of the internal electrodes 12 and 13 are positioned at the side surfaces s of the laminated body 16. The respective edges of the internal electrodes 12 and 13 along the Y-axis are aligned vertically within 0.5 µm along the Y-axis.

A pair of side margin parts 17 respectively cover the pair of side surfaces s of the laminated body 16 exposing the respective edges of the internal electrodes 12 and 13. That is, in the ceramic main body 11, the side surfaces s are boundary surfaces between the laminated body 16 and the side margin parts 17. The side margin parts 17 secure insulation between the internal electrodes 12 and 13 at the pair of the side surfaces s.

In the ceramic main body 11, in order to provide for a high capacitance in each ceramic layer between the internal electrodes 12 and 13, a high permittivity ceramic dielectric is used. Such a ceramic dielectric having a high permittivity may be a perovskite material that includes barium (Ba) and titanium (Ti), exemplified by barium titanate ($BaTiO_3$).

Here, the ceramic layer may be made of the strontium titanate ($SrTiO_3$) system; the calcium titanate ($CaTiO_3$) system; the magnesium titanate ($MgTiO_3$) system; the calcium zirconate ($CaZrO_3$) system; the calcium titanate zirconate ($Ca(Zr, Ti)O_3$) system; the barium zirconate ($BaZrO_3$) system; and the titanium dioxide ($TiO_2$) system instead.

The internal electrodes 12 and 13 are made of a good electrically conductive material. Such a material may be typically nickel (Ni), but other than nickel, it may be a metal material having copper (Cu), palladium (Pd), platinum (Pt), silver (Ag), or gold (Au) as its main component, or an alloy of these materials.

<Detailed Structure of Cover Parts 19 and 20>

Figure 4:
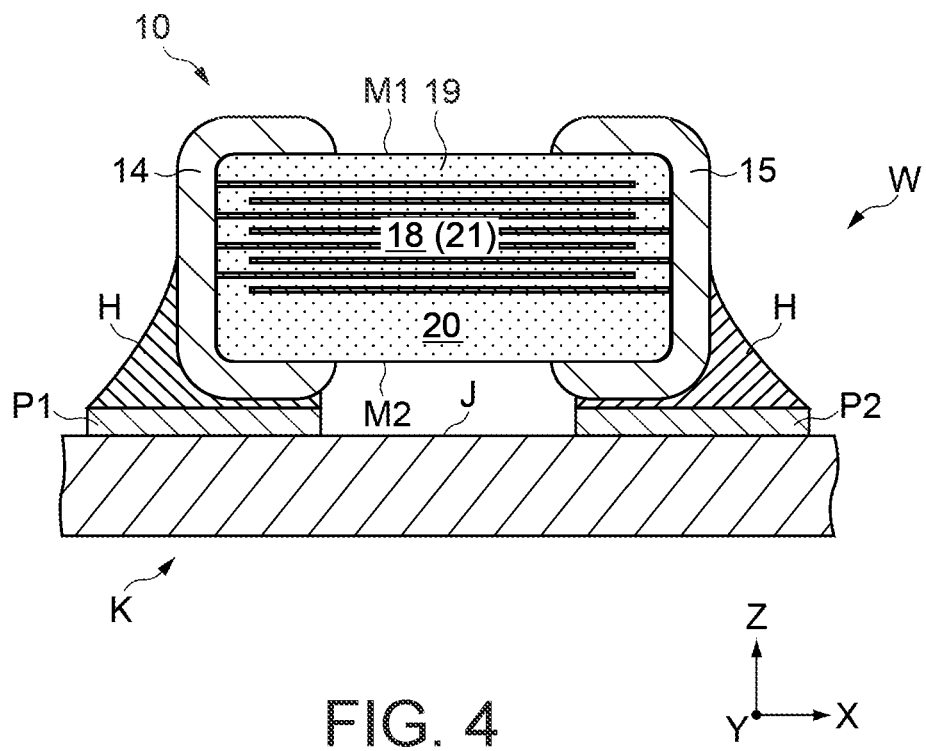
FIG. 4 is a partial cross-sectional view of a component mounting substrate mounting the above-mentioned multilayer ceramic capacitor.
Figure 5:
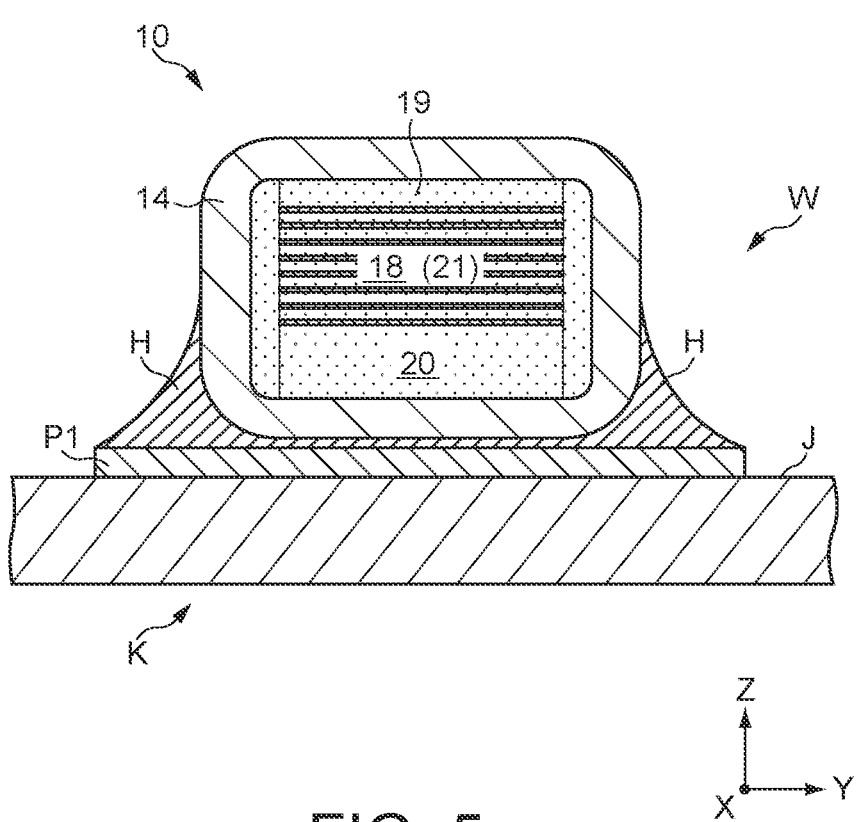
FIG. 5 is a partial cross-sectional view of the component mounting substrate mounting the above-mentioned multilayer ceramic capacitor.

FIGS. 4 and 5 are partial cross-sectional views of a component mounting substrate W mounting the multilayer ceramic capacitor 10. The component mounting substrate W has a board-like shape extending in the X-Y plane, and includes, for example, a circuit substrate K, which is a ceramic substrate or a resin substrate. In the circuit substrate K, the front surface facing the positive Z-direction is a mounting surface J on which electrodes pads P1 and P2 are provided.

The component mounting substrate W includes solders H that comment the external electrodes 14 and 15 to the electrode pads P1 and P2, respectively, in the state that the second main surface M2 of the ceramic main body 11 faces the mounting surface J. The solders H fill spaces between the external electrodes 14 and 15 and the electrode pads P1 and P2, respectively, and wet the external surfaces of the external electrodes 14 and 15 upwardly.

Thus, in the multilayer ceramic capacitor 10, regions of the external electrodes on the side of the mounting surface J are covered by the solders H. The amount of the solder H that covers the external electrode 14/15 is greater as the position is closer to the mounting surface J. Because of this, in the multilayer ceramic capacitor 10 that has been mounted, the closer the regions is to the mounting surface J, the greater the influence of the solder H.

In multilayer ceramic capacitors in general, due to fluxes contained in the solders H, corrosion due to moisture intrusion and hydrogen generation progresses into the ceramic main body 11. When such corrosion reaches the internal electrode facing part 21 beyond the second cover parts 20, insulation between the internal electrodes 12 and 13 in the internal electrode facing part 21 is lost.

In contrast, in the multilayer ceramic capacitor 10 of the present embodiment, the second cover part 20 is formed thick. Because of this structure, the second cover part 20 expands the spacings between the solders H that cover the external electrodes 14 and 15 and the internal electrode facing part 21 on the side of the second main surface M2, thereby functioning as a protective region.

Thus, in the multilayer ceramic capacitor 10, due to the protective region constructed of the second cover part 20, the internal electrode facing part 21 is protected from the fluxes contained in the solders H. That is, in the multilayer ceramic capacitor 10, insulation between the internal electrodes 12 and 13 in the internal electrode facing part 21 is not likely to be lost, thereby providing a high reliability.

FIG. 6 is a magnified cross-sectional view of only the ceramic main body of the multilayer ceramic capacitor 10 shown in FIGS. 2 and 4. FIG. 6 shows the thickness $t_{11}$ along the Z-axis of the ceramic main body 11, the thickness $t_{19}$ along the Z-axis of the first cover part 19, and the thickness $t_{20}$ along the Z-axis of the second cover part 20.

In the multilayer ceramic capacitor 10, the thickness $t_{20}$ of the second cover part 20 is made greater than the thickness $t_{19}$ of the first cover part 19. Because of this, in the multilayer ceramic capacitor 10, the spacings between the external electrodes 14 and 15 and the solders H are expanded in the Z direction by the second cover part 20 constituting the protective region.

The thickness $t_{20}$ of the second cover part 20 is preferably as large as possible within the range in which the necessary capacitance can be secured in the functional part 18. For example, the thickness $t_{20}$ is preferably equal to or greater than 2 times and equal to or less than 4 times as large as the thickness $t_{19}$ of the first cover part 19, and is preferably equal to or greater than 1/25th and equal to or less than 1/10th of the thickness $t_{11}$ of the ceramic main body 11.

FIG. 6 also shows ridge parts R that extend along the four sides of the second main surface M2 of the ceramic main body 11. The ridge parts R are chamfered and therefore are rounded, and smoothly connect the second main surface M2 to the side surfaces S1 and S2 and the end surfaces E1 and E2. At the ridge parts R, the larger the radius of curvature, the shorter the distance between the surface of the ridge parts R to the internal electrode facing part 21, which would cause the corrosion due to fluxes to easily progress to the internal electrode facing part 21.

Because of this, in the multilayer ceramic capacitor 10, the thickness $t_{20}$ of the second cover part 20, which constitutes the protective region, is preferably set to be sufficiently larger than the dimension $t_R$ along the Z-axis, which corresponds to the radius of curvature, of the ridge parts R of the ceramic main body 11. Specifically, the thickness $t_{20}$ of the second cover part 20 is preferably equal to or greater than 2.5 times as large as the dimension $t_R$, along the Z-axis, of the ridge parts R of the ceramic main body 11.

Further, in the multilayer ceramic capacitor 10, for miniaturization and larger capacitance, the thickness $t_{19}$ of the first cover part 19 is preferably as small as possible within the range in which the functional part 18 can be protected adequately from the external environmental influences. For that purpose, the thickness $t_{19}$ of the first cover part 19 is preferably equal to or greater than 5 μm and equal to or less than 15 μm.

<Manufacture Method of Multilayer Ceramic Capacitor 10>

Figure 7:
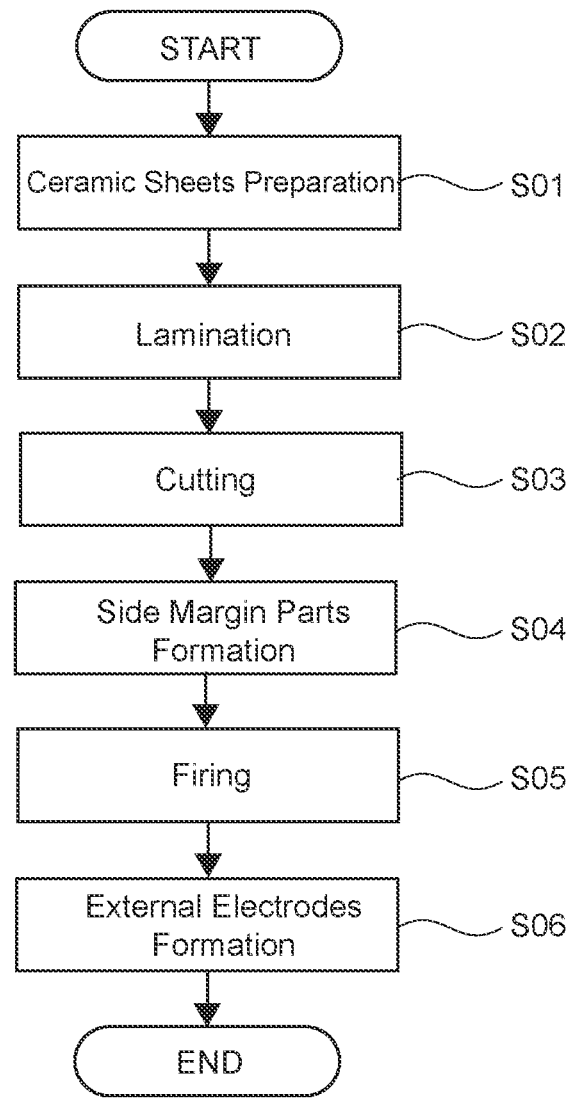
FIG. 7 is a flowchart of a manufacture method of the above-mentioned multilayer ceramic capacitor.

FIG. 7 is a flowchart showing a manufacture method of the multilayer ceramic capacitor 10 of the present embodiment. FIGS. 8-12 are figures showing manufacturing steps of the multilayer ceramic capacitor 10. The manufacture method of the multilayer ceramic capacitor 10 will be explained along FIG. 7 with reference to FIGS. 8-12.

<Step S01: Ceramic Sheets Preparation>

At step S01, first ceramic sheets 101 and second ceramic sheets 102, which are for forming the functional part 18, and third ceramic sheets 103 for forming the cover parts 19 and 20 are prepared. The ceramic sheets 101, 102, and 103 are dielectric green sheets yet to be fired, having a ceramic dielectric as their main components.

The ceramic sheets 101, 102, and 103 are made into a sheet shape by a roll coater or doctor blade, for example. The thicknesses of the ceramic sheets 101 and 102 are adjusted based on the desired thickness of the ceramic layers in the functional part 18. The thickness of the third ceramic sheets 103 may be adjusted as needed.

Figure 8:
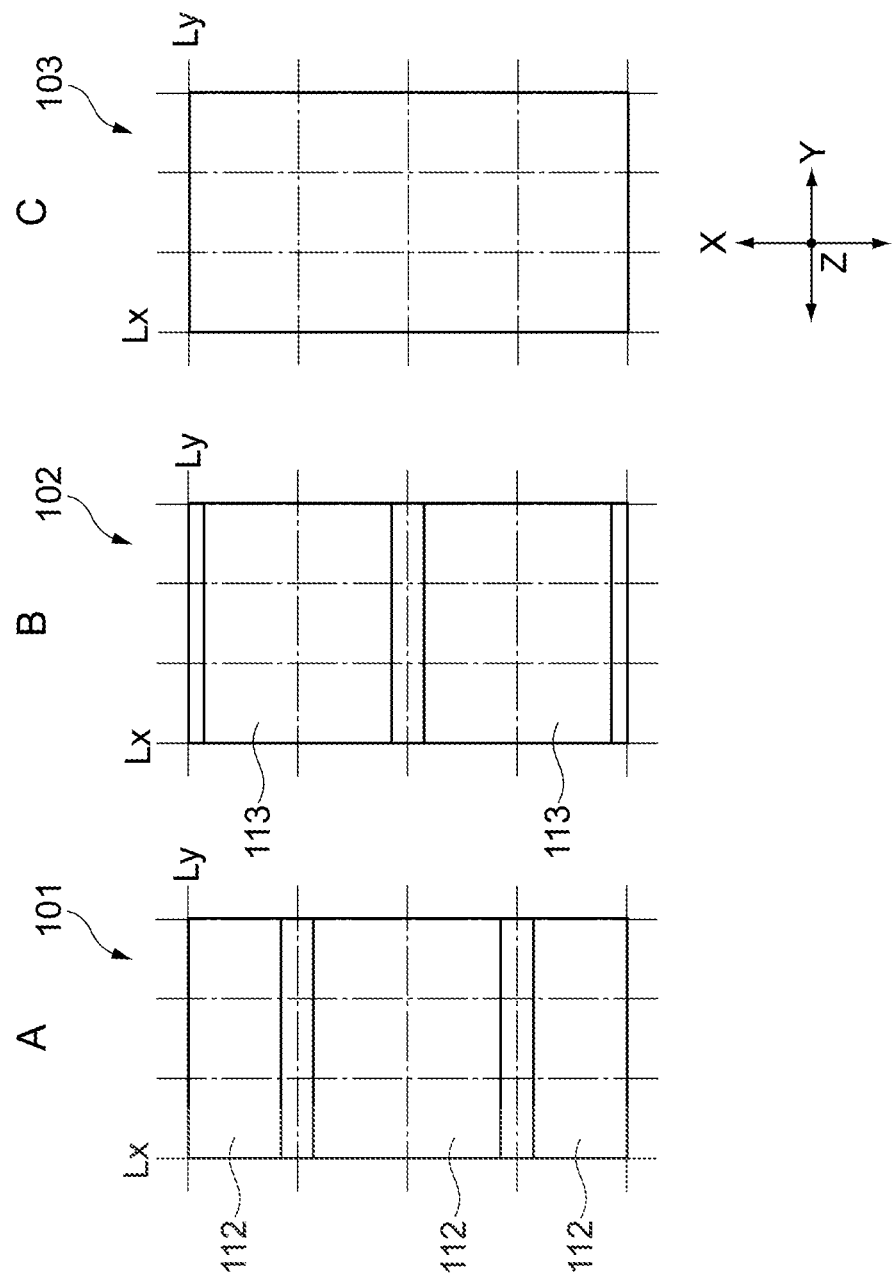
FIG. 8 is a plan view for step S01 of the above-mentioned manufacture method.

FIG. 8 is a plan view of the ceramic sheets 101, 102, and 103. At this stage, the ceramic sheets 101, 102, and 103 are mother sheets that are yet to be separated. FIG. 8 shows the cutting lines Lx and Ly that will separate the sheets into respective individual laminated bodies 116. The cutting lines Lx are parallel to the X-axis, and the cutting lines Ly are parallel to the Y-axis.

As shown in FIG. 8, each of the first ceramic sheets 101 has first internal electrodes 112 yet to be fired, which will become the first internal electrodes 12, formed thereon, and each of the second ceramic sheets 102 has second internal electrodes 113 yet to be fired, which will become the second internal electrodes 13, formed thereon. Here, each of the third ceramic sheets 103 for the cover parts 19 and 20 does not have any internal electrodes formed thereon.

The internal electrodes 112 and 113 may be formed by coating an appropriate conductive paste on the ceramic sheets 101 and 102, respectively. The method for coating the conductive paste may be selected from known methods. For example, the coating of the conductive paste may be performed by screen printing or gravure printing.

In the internal electrodes 112 and 113, spaces along the cutting lines Ly are formed for every other lines of Ly. The spaces in the first internal electrode 112 and the spaces in the second internal electrode 113 are arranged in the X-direction alternately in a staggered manner. That is, the cutting lines Ly that pass through the spaces in the first internal electrode 112 and the cutting lines Ly that pass through the spaces in the second internal electrode 113 are arranged alternately.

<Step S02: Lamination>

Figure 9:
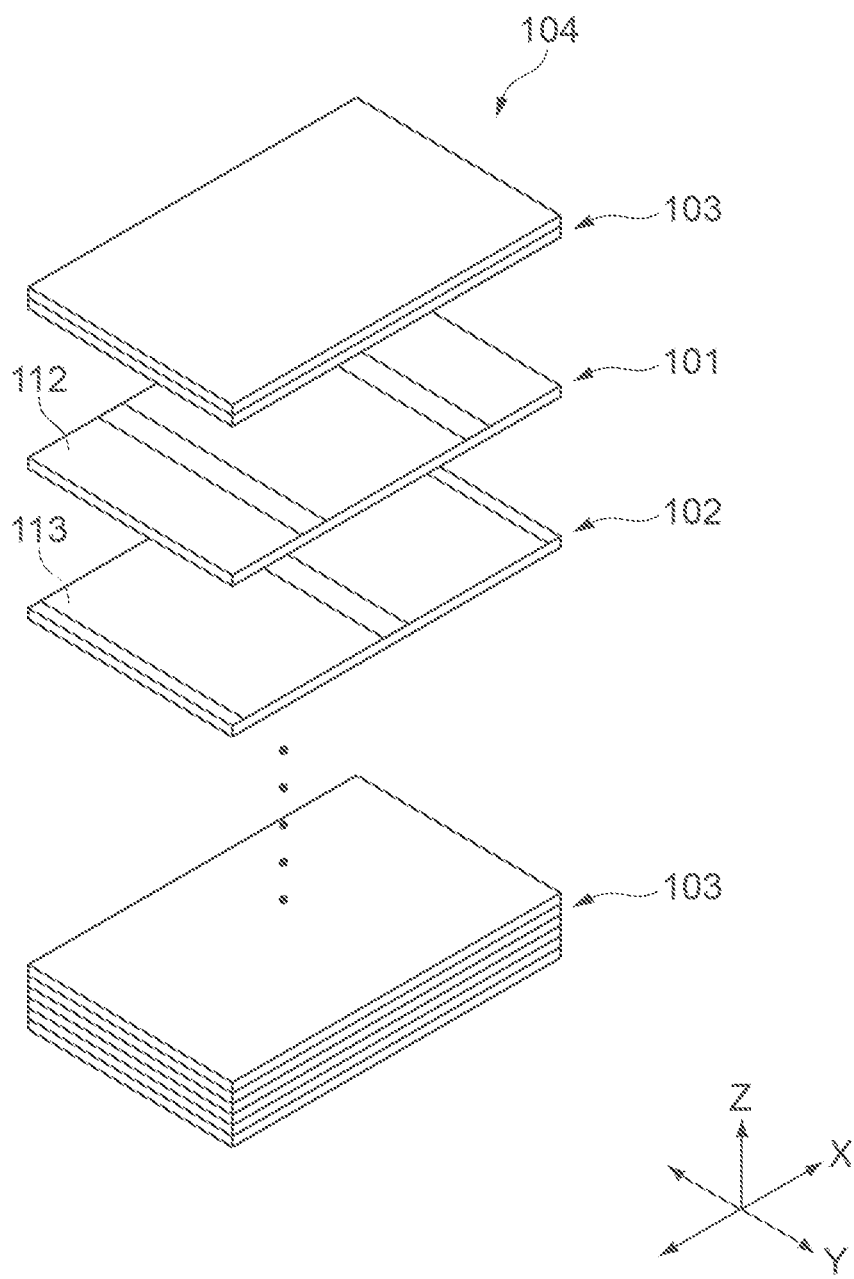
FIG. 9 is a perspective view for step S02 of the above-mentioned manufacture method.

At step S02, the ceramic sheets 101, 102 and 103 that are prepared at step S01 are laminated, as shown in FIG. 9, to form laminated sheets 104. In the laminated sheets 104, the first ceramic sheets 101 and the second ceramic sheets 102, which will become the functional part 18, are alternately laminated in the Z-direction.

Further, in the laminated sheets 104, the third ceramic sheets 103, which will become the cover parts 19 and 20, are laminated on the top surface and on the bottom surface of the alternately laminated ceramic sheets 101 and 102. The thicknesses $t_{19}$ and $t_{20}$ of the cover parts 19 and 20 can be adjusted by, for example, adjusting the number of lamination of the third ceramic sheets 103.

The laminated sheets 104 are put together by pressure joining the ceramic sheets 101, 102, and 103. For the pressure-joining of the ceramic sheets 101, 102, and 103, hydrostatic pressurization or uniaxial pressurization is preferably used, for example. This can create a highly packed laminated sheets 104.

<Step S03: Cutting>

At step S03, the laminated sheets 104 obtained in step S02 are cut along the cutting lines Lx and Ly to form a plurality of laminated bodies 116 that are yet to be fired. The laminated body 116 will become the laminated body 16 after being fired. For the cutting of the laminated sheets 104, a push-cutting blade or rotary blade may be used.

Figure 10:
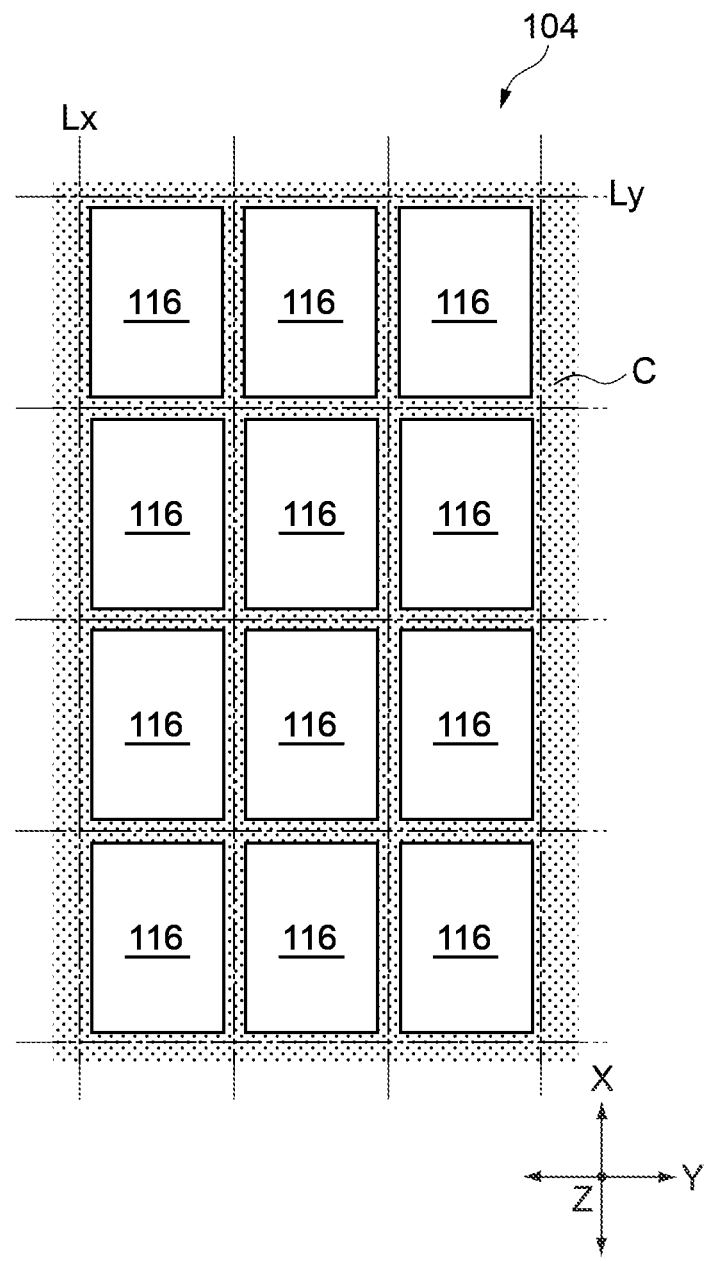
FIG. 10 is a plan view for step S03 of the above-mentioned manufacture method.

FIG. 10 is a plan view of the laminated sheets 104 after step S03. The laminated sheets 104 are cut while it is held on an adhesive sheet C, which may be a foam release sheet, for example. The laminated sheets 104 are separated in this way to form the plurality of laminated bodies 116.

Figure 11:
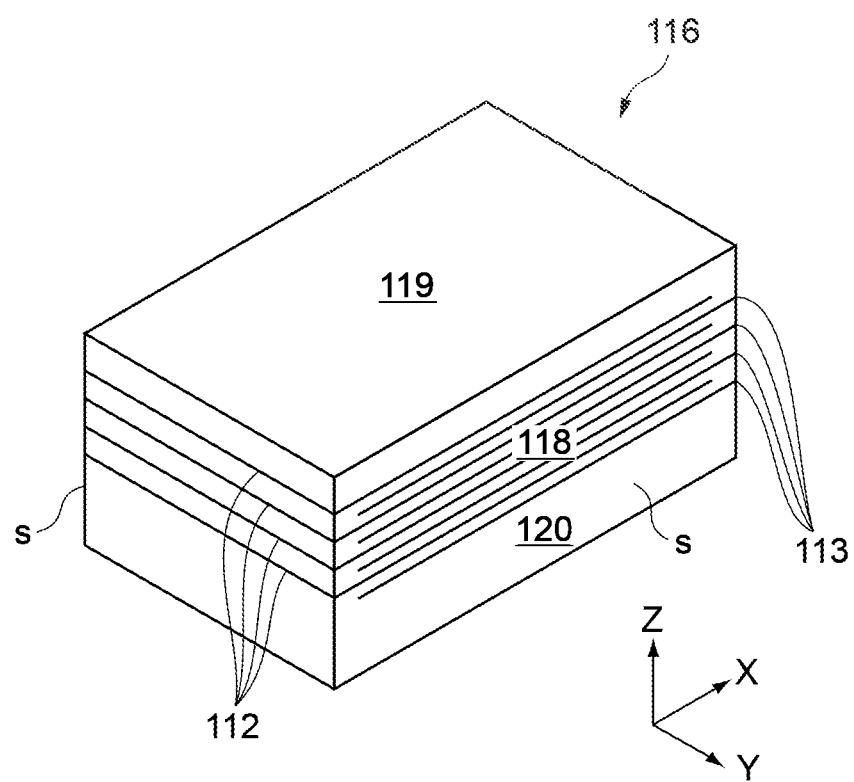
FIG. 11 is a perspective view of a laminated body obtained in step S03 of the above-mentioned manufacture method.

FIG. 11 is a perspective view of the laminated body 116 yet to be fired, obtained in step S03. In the laminated body 116, a functional part 118 and cover parts 119 and 120, which are yet to be fired, have been formed. Further in the laminated body 116, on the side surfaces s, which are cut surfaces, lateral edges, along the Y-axis, of the internal electrodes 112 and 113 are exposed, and are aligned on these surfaces, respectively.

<Step S04: Side Margin Parts Formation>

Figure 12:
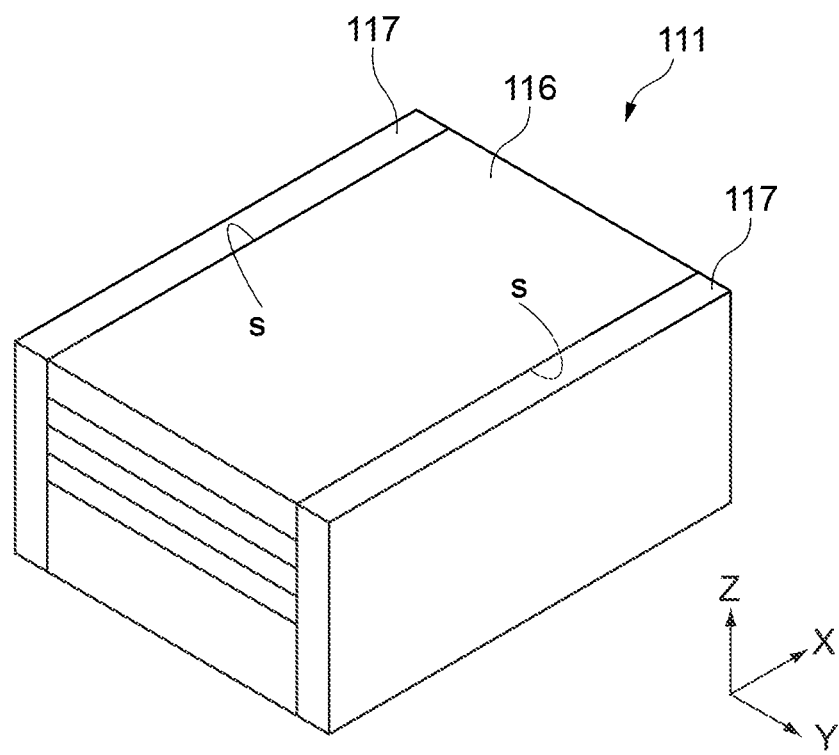
FIG. 12 is a perspective view of a ceramic main body obtained in step S04 of the above-mentioned manufacture method.

At step S04, side margin parts 117, which are yet to be fired, are formed on both side surfaces s of the laminated body 116 obtained in step S03. This forms a ceramic main body 111 yet to be formed, as shown in FIG. 12. The side margin parts 117 may be formed by attaching a ceramic sheet on each of the side surfaces s of the laminated body 116.

<Step S05: Firing>

At step S05, the ceramic main body 111, which is obtained in step S04, as shown in FIG. 12, is fired to form the ceramic main body 11 shown in FIGS. 1-3. That is, at step S05, the laminated body 116 becomes the laminated body 16, and the side margin parts 117 becomes the side margin parts 17.

The firing temperature at step S05 may be determined based on the sintering temperature of the ceramic main body 111. For example, when the barium titanate ($BaTiO_3$) system material is used, the firing temperature may be 1000° C. to 1300° C. or the like. The firing may be performed in a reducing atmosphere or low oxygen partial pressure atmosphere.

<Step S06: External Electrodes Formation>

At step S06, the external electrodes 14 and 15 are respectively formed on the end surfaces of the ceramic main body 11 obtained in step S05, thereby completing the multilayer ceramic capacitor 10, as shown in FIGS. 1-3. The method for forming the external electrodes 14 and 15 at step S06 may be appropriately selected from known methods, such as a dipping method or plating method.

Embodiment 2

<Structure of Multilayer Ceramic Capacitor 10a>

A multilayer ceramic capacitor 10a according to Embodiment 2 of the present invention will be explained. Below, the elements of the multilayer ceramic capacitor 10a that are different from those of the multilayer ceramic capacitor 10 are mainly explained, and the elements that are common to the multilayer ceramic capacitors 10 and 10a are referred to by the same reference characters/numerals, and the explanation thereof will be omitted when appropriate.

Figure 13:
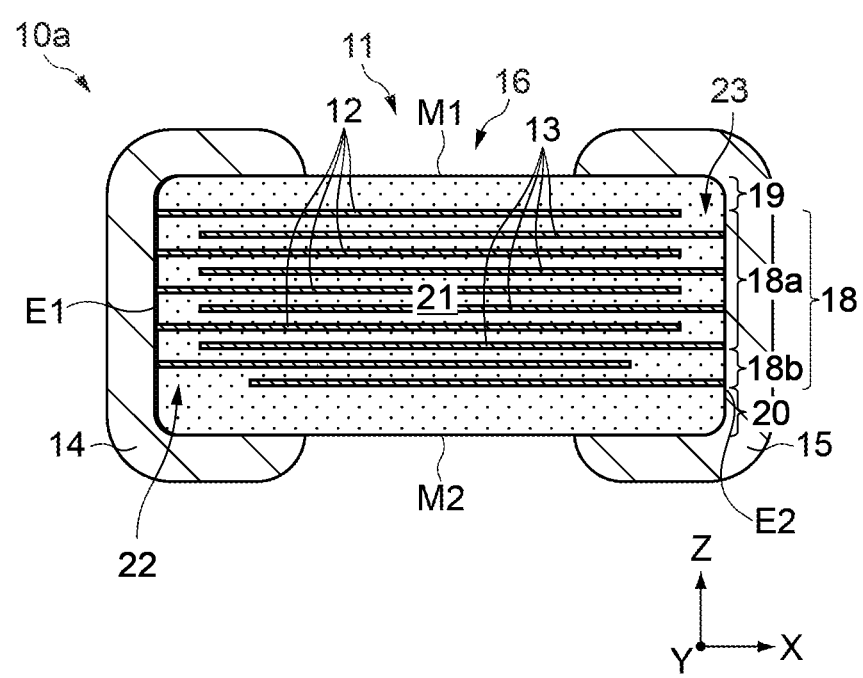
FIG. 13 is a cross-sectional view of a multilayer ceramic capacitor according to Embodiment 2 of the present invention.
Figure 14:
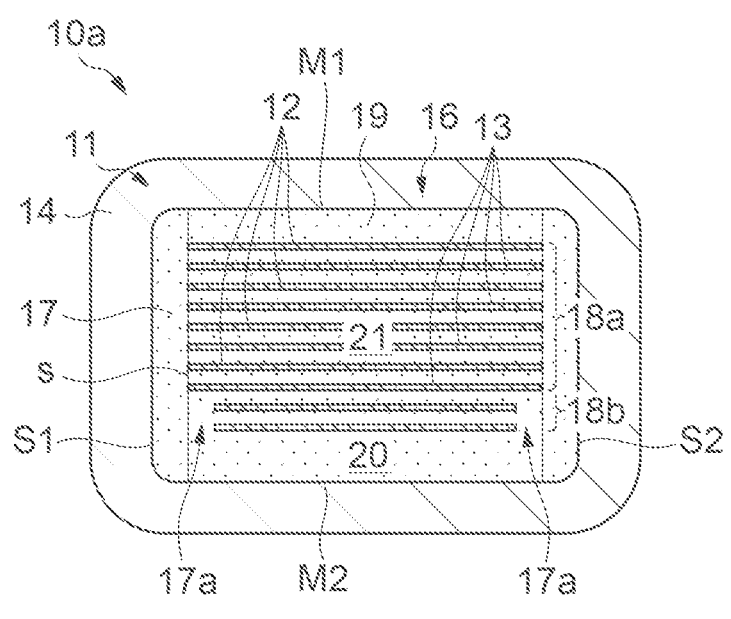
FIG. 14 is a cross-sectional view of the multilayer ceramic capacitor of Embodiment 2.

FIGS. 13 and 14 are cross-sectional views of the multilayer ceramic capacitor 10a. In the multilayer ceramic capacitor 10a, the functional part 18 includes a first functional part 18a and a second functional part 18b. The first functional part 18a is provided next to the first cover part 19. The second functional part 18b is disposed between the first functional part 18a and the second cover part 20.

In the functional part 18, the first functional part 18a has a structure that is similar to the first functional part 18 of Embodiment 1. That is, in the first functional part 18a, the internal electrodes 12 and 13 are formed to span the entire width along the Y-axis, and the lateral edges of the internal electrodes 12 and 13 are positioned on the side surfaces s of the laminated boy 16 that are covered by the side margin parts 17. The overlap areas between the internal electrodes 12 and 13 have the same shape and dimensions in this embodiment.

In the second functional part 18b, the dimension of the internal electrodes 12 and 13 along the Y-axis is smaller than that in the first functional part 18a. Because of this, in the second functional part 18b, the lateral edges, along the Y-axis, of the internal electrodes 12 and 13 are located on inner sides of the side surfaces s of the laminated body 16 that are covered by the side margin parts 17, and the dimension of the internal electrode facing part 21 along the Y-axis is smaller than that in the first functional part 18a.

With this structure, on both sides of the internal electrode facing part 21 of the second functional part 18b along the Y-axis, auxiliary side margin parts 17a in which no internal electrodes are present are formed. The auxiliary side margin parts 17a together with the side margin parts 17 provide spacings between the side surfaces S1 and S2 of the ceramic main body 11 and the internal electrode facing part 21.

Further, in the second functional part 18b, the dimension of the internal electrodes 12 and 13 along the X-axis is also smaller than that in the first functional part 18a. Because of this, in the second functional part 18b, the dimension of the internal electrode facing part 21 along the X-axis is smaller than that in the first functional part 18a, and the dimension of the end margin part 22 and 23 along the X-axis is larger than that in the first functional part 18a. Thus, the overlap areas between the internal electrodes 12 and 13 in the second functional part 18b have the shape and dimensions different from those in the first functional part 18a in this embodiment.

Figure 15:
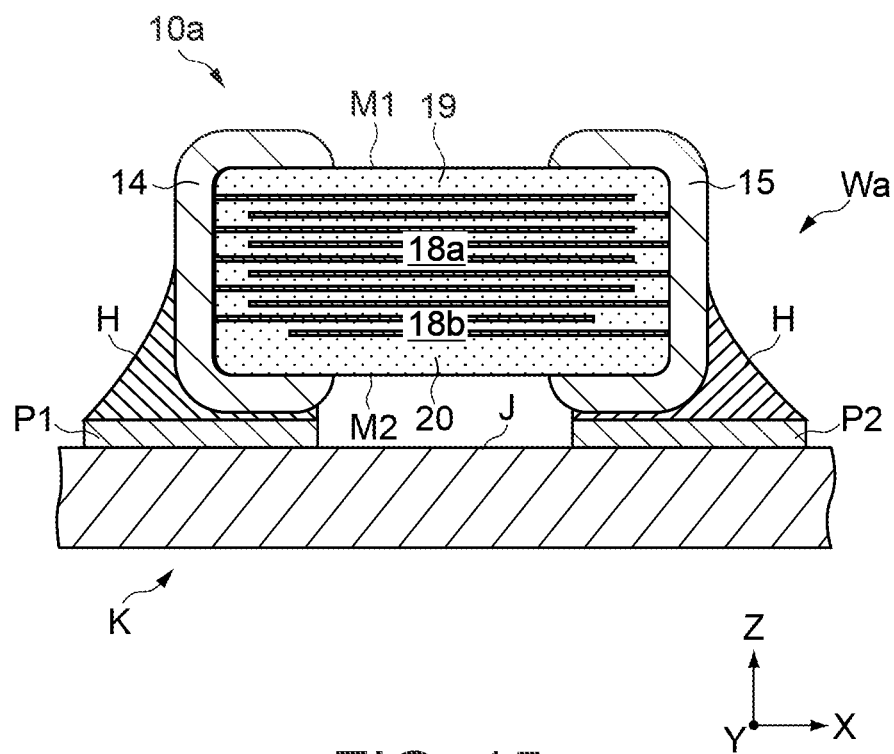
FIG. 15 is a partial cross-sectional view of a component mounting substrate mounting the multilayer ceramic capacitor of Embodiment 2.
Figure 16:
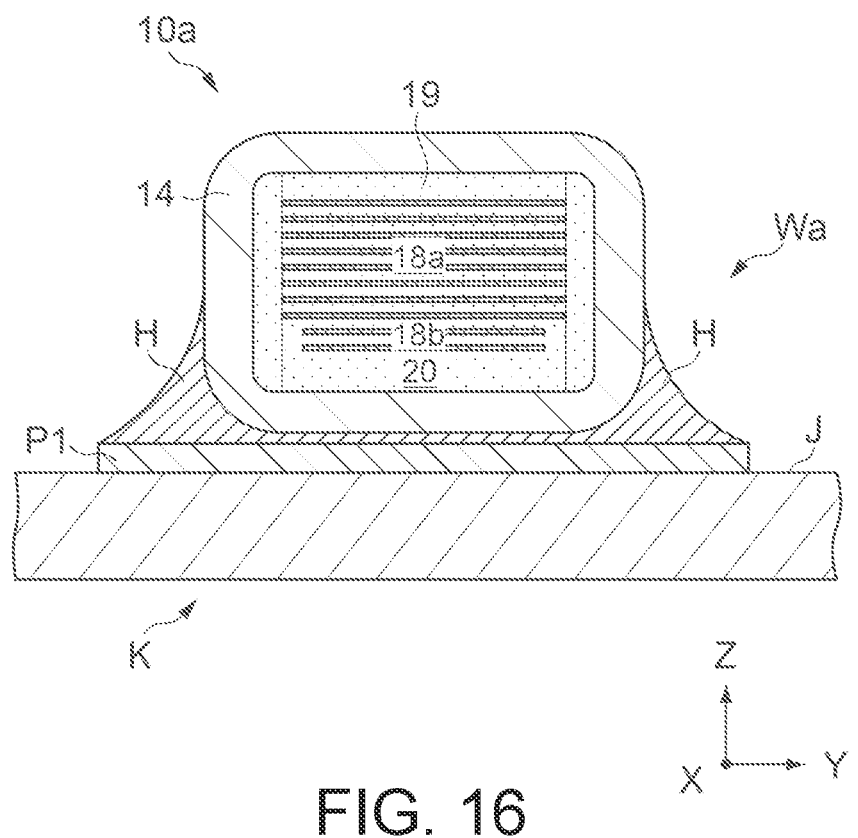
FIG. 16 is a partial cross-sectional view of the component mounting substrate mounting the multilayer ceramic capacitor of Embodiment 2.

FIGS. 15 and 16 are partial cross-sectional views of a component mounting substrate Wa mounting the multilayer ceramic capacitor 10a. In the multilayer ceramic capacitor 10a, the second functional part 18b and the second cover part 20 are a protective region that expands the spacings between the solders H that cover the external electrodes 14 and 15 and the internal electrode facing part 21.

In more detail, in the multilayer ceramic capacitor 10a, the side margin part 17 is expanded along the Y-axis via the auxiliary side margin parts 17a of the second functional part 18b. Therefore, in the multilayer ceramic capacitor 10a, the spacings between the solders H that cover the external electrodes 14 and 15 and the internal electrode facing part 21 can be expanded along the Y-axis.

Further, in the multilayer ceramic capacitor 10a, in the second functional part 18b, the end margin parts 22 and 23 are expanded. Therefore, in the multilayer ceramic capacitor 10a, the spacings between the solders H that cover the external electrodes 14 and 15 and the internal electrode facing part 21 can be expanded along the X-axis via the second functional part 18b.

Thus, in the multilayer ceramic capacitor 10a, not only the second cover part 20, but also the second functional part 18b in which internal electrodes 12 and 13 are arranged constitute the protective region. Because of this, in the multilayer ceramic capacitor 10a, a reduction of the capacitance due to the protective region can be made small.

FIG. 17 is a magnified cross-sectional view of the ceramic main body 11 shown in FIGS. 13 and 15. In addition to the dimensions $t_{11}$, $t_{19}$, $t_{20}$, and $t_R$, as described above, the thickness tin of the second functional part 18b is indicated in the figure. In the multilayer ceramic capacitor 10a, the thickness of the protective region is set in the same manner as in Embodiment 1.

As shown in FIG. 17, in the multilayer ceramic capacitor 10a also, the thickness of the protective region is greater than the thickness $t_{19}$ of the first cover part 19. Therefore, in the multilayer ceramic capacitor 10a, the sum of the thicknesses of the cover part 20 and the second functional part 18b, which together constitute the protective region, $t_{20}+t_{18b}$, is greater than the thickness $t_{19}$ of the first cover part 19.

Here, in the multilayer ceramic capacitor 10a also, the total thickness $t_{20}+t_{18b}$ of the protective region is preferably equal to or greater than 2.5 times as large as the dimension $t_R$ of the ridge parts R of the ceramic main body 11, is also preferably equal to or greater than 2 times and equal to or less than 4 times as large as the thickness $t_{19}$ of the first cover part 19, and is preferably equal to or greater than ¹⁄25th and equal to or less than ¹⁄10th of the thickness $t_{11}$ of the ceramic main body 11.

<Manufacture Method for Multilayer Ceramic Capacitor 10a>

Figure 18:
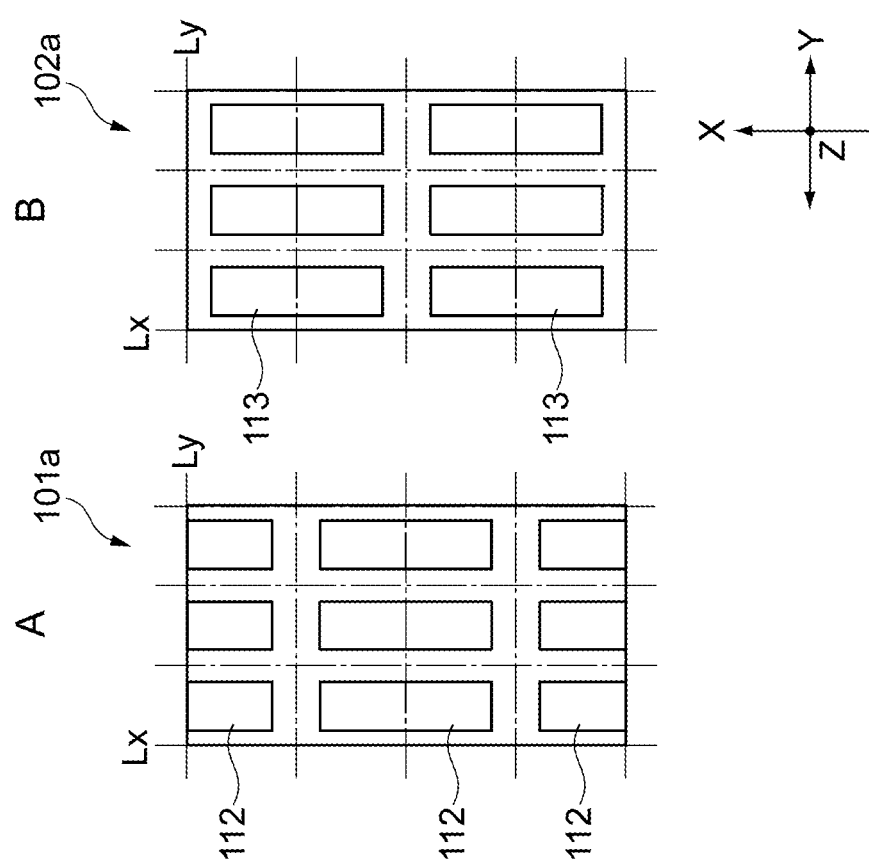
FIG. 18 is a plan view for step S01 of a manufacture method for the multilayer ceramic capacitor of Embodiment 2.
Figure 19:
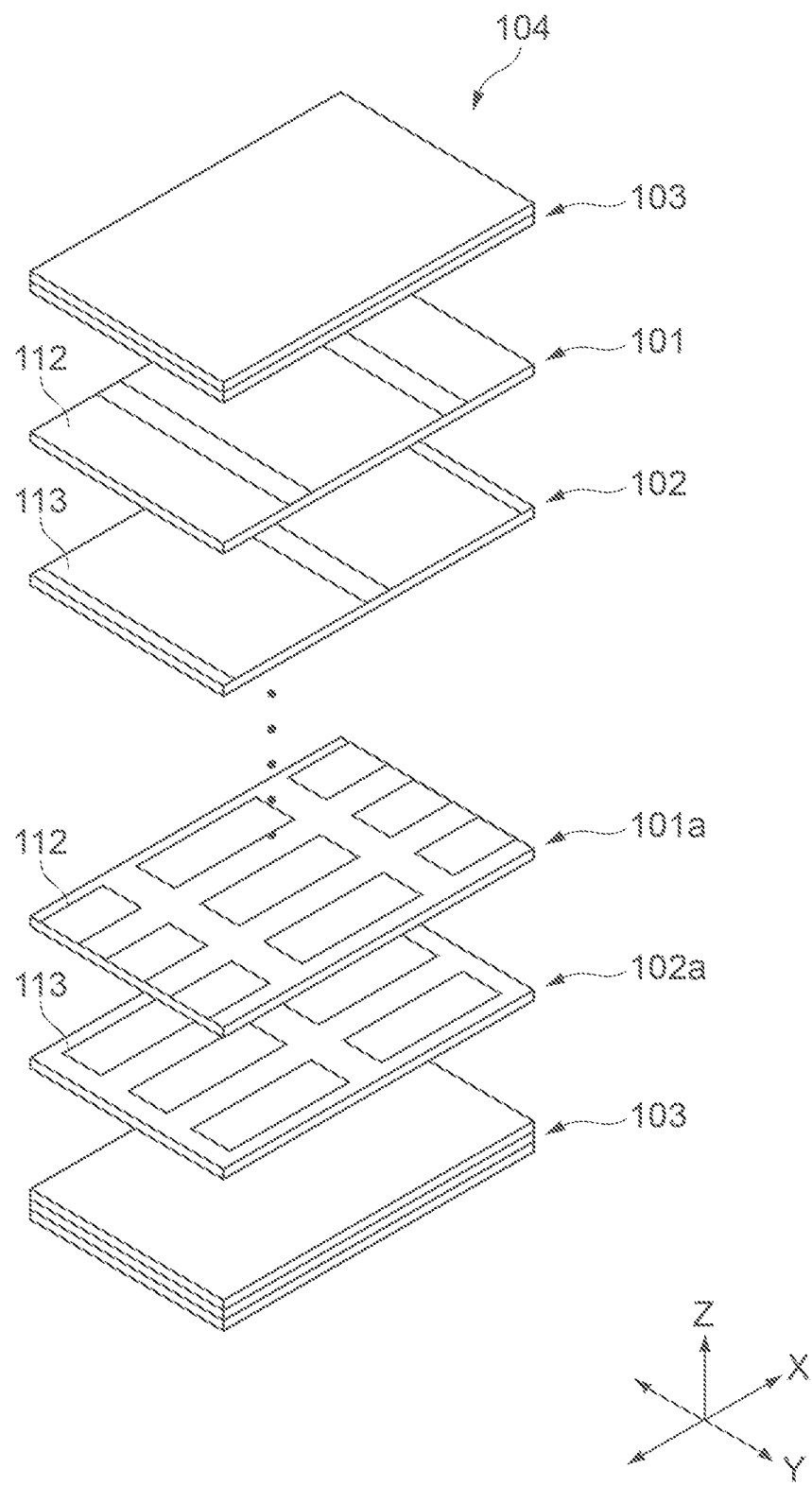
FIG. 19 is a perspective view for step S02 of the manufacture method for the multilayer ceramic capacitor of Embodiment 2.

A method for manufacturing the multilayer ceramic capacitor 10a of the present embodiment differs from the method for manufacturing the multilayer ceramic capacitor 10 shown in FIG. 7 with respect to only steps S01 and S02. FIG. 18 shows step S01 of the present embodiment. FIG. 19 shows step S02 of the present embodiment.

At step S01 of the present embodiment, in addition to the ceramic sheets 101, 102, and 103, ceramic sheets 101a and 102a for forming the second functional part 18b shown in FIG. 18 are prepared. On the ceramic sheets 101a and 102a, the patterns of the internal electrodes 112 and 113 differ from those on the ceramic sheets 101 and 102.

Specifically, in the ceramic sheets 101a and 102a, in the internal electrodes 112 and 113, spaces that run along the cutting lines Lx are formed. Because of this structure, in the multilayer ceramic capacitor 10a, the auxiliary side margin parts 17a shown in FIG. 14 are provided in the second functional part 18b.

Furthermore, in the ceramic sheets 101a and 102a, the spaces that run along the cutting lines Ly are wider along the X-axis than those in the ceramic sheets 101 and 102. Because of this structure, in the multilayer ceramic capacitor 10a, the dimensions of the end margin parts 22 and 23 in the second functional part 18b along the X-axis are larger than those in the first functional part 18a.

At step S02 of the present embodiment, as shown in FIG. 19, the ceramic sheets 101 and 102 are laminated to form the first functional part 18a, and the ceramic sheets 101a and 102a are laminated to form the second functional part 18b so as to form the laminated sheets 104 having the structure corresponding to the structure of the multilayer ceramic capacitor 10a.

Embodiment 3

<Structure of Multilayer Ceramic Capacitor 10b>

A multilayer ceramic capacitor 10b according to Embodiment 3 of the present invention will be described. Below, the elements of the multilayer ceramic capacitor 10b that are different from those of the multilayer ceramic capacitor 10a are mainly explained, and the elements that are common to the multilayer ceramic capacitors 10a and 10b are referred to by the same reference characters/numerals, and the explanation thereof will be omitted when appropriate.

Figure 20:
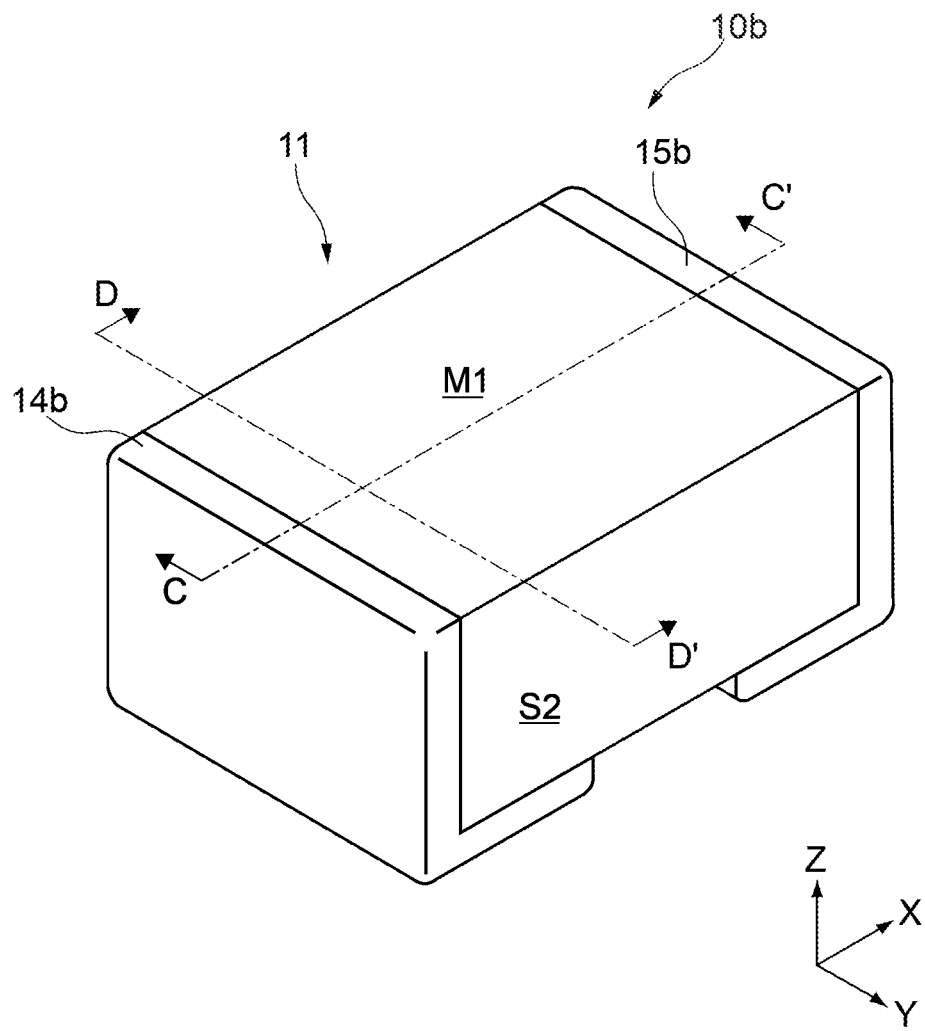
FIG. 20 is a perspective view of a multilayer ceramic capacitor according to Embodiment 3 of the present invention.
Figure 21:
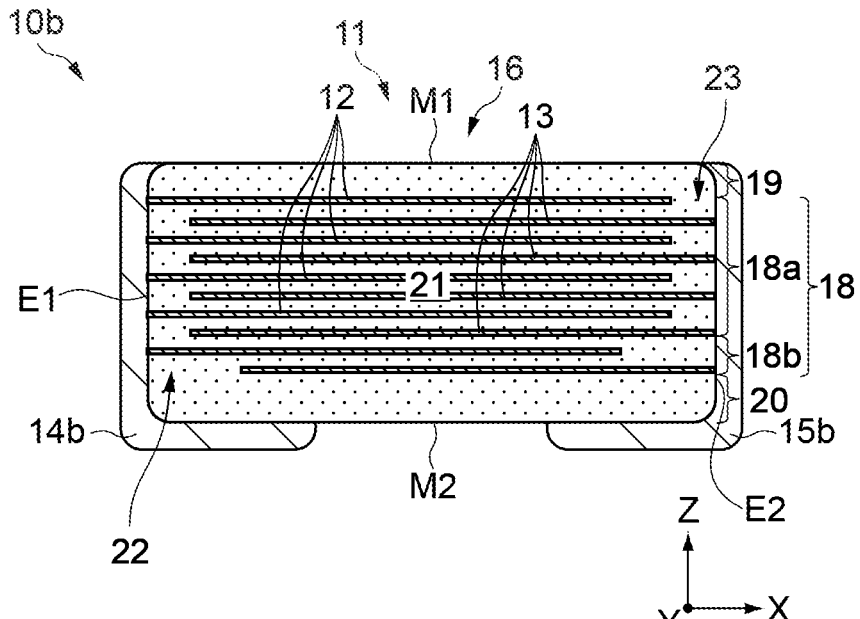
FIG. 21 is a cross-sectional view of the multilayer ceramic capacitor of FIG. 20 taken along the line C-C' of FIG. 20.
Figure 22:
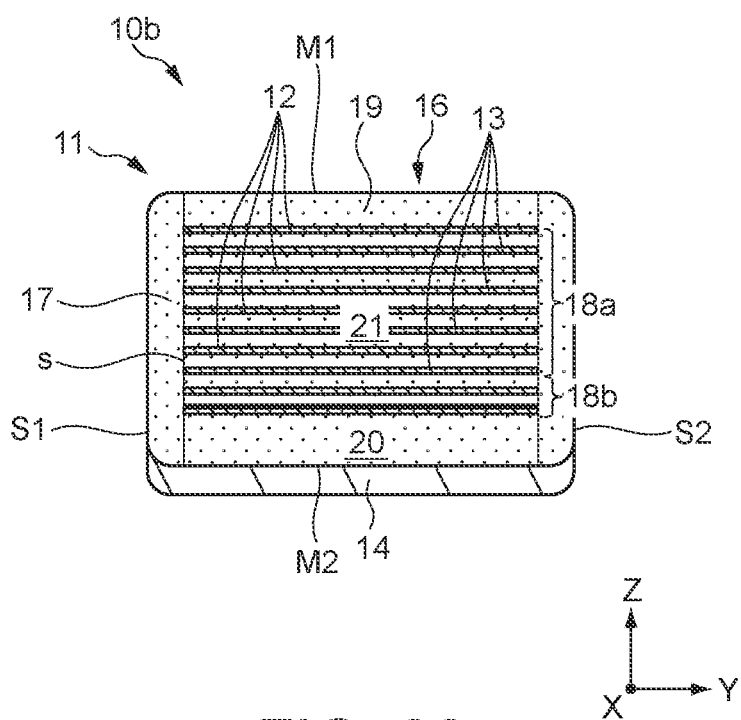
FIG. 22 is a cross-sectional view of the multilayer ceramic capacitor of FIG. 20 taken along the line D-D' of FIG. 20.

FIGS. 20-22 show the multilayer ceramic capacitor 10b of Embodiment 3. FIG. 20 is a perspective view of the multilayer ceramic capacitor 10b. FIG. 21 is a cross-sectional view of the multilayer ceramic capacitor 10b, taken along the line C-C' of FIG. 20. FIG. 22 is a cross-sectional view of the multilayer ceramic capacitor 10b, taken along the line D-D' of FIG. 20.

In the multilayer ceramic capacitor 10b, the external electrodes 14b and 15b respectively cover the end surfaces E1 and E2 of the ceramic main body 11, but extend only to the second main surfaced M2. That is, the external electrodes 14b and 15b do not extend to the first main surface M1 or to the side surfaces S1 and S2, and each have an L-shape in a cross section taken along the X-Z plane.

In the multilayer ceramic capacitor 10b, because the external electrodes 14b and 15b are not arranged on the first main surface M1 of the ceramic main body 11, the device can be made thinner in the Z-direction. Further, in the multilayer ceramic capacitor 10b, because the external electrodes 14b and 15b are not arranged on the side surfaces S1 and S2 of the ceramic main body 11, the device can be made smaller along the Y-axis.

In the multilayer ceramic capacitor 10b also, the second functional part 18b and the second cover part 20 constitute the protective region that expand the spacings between the solders H that cover the external electrodes 14b and 15b and the internal electrode facing part 21. In the multilayer ceramic capacitor 10b, the structure of the second functional part 18b differ from that in Embodiment 2.

Figure 23:
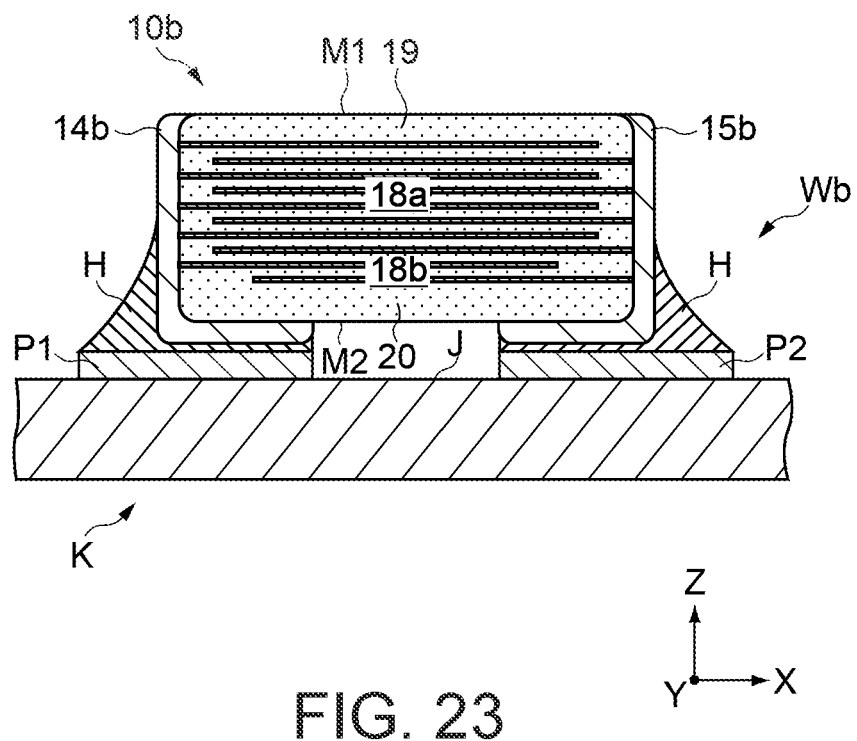
FIG. 23 is a partial cross-sectional view of a component mounting substrate mounting the multilayer ceramic capacitor of Embodiment 3.
Figure 24:
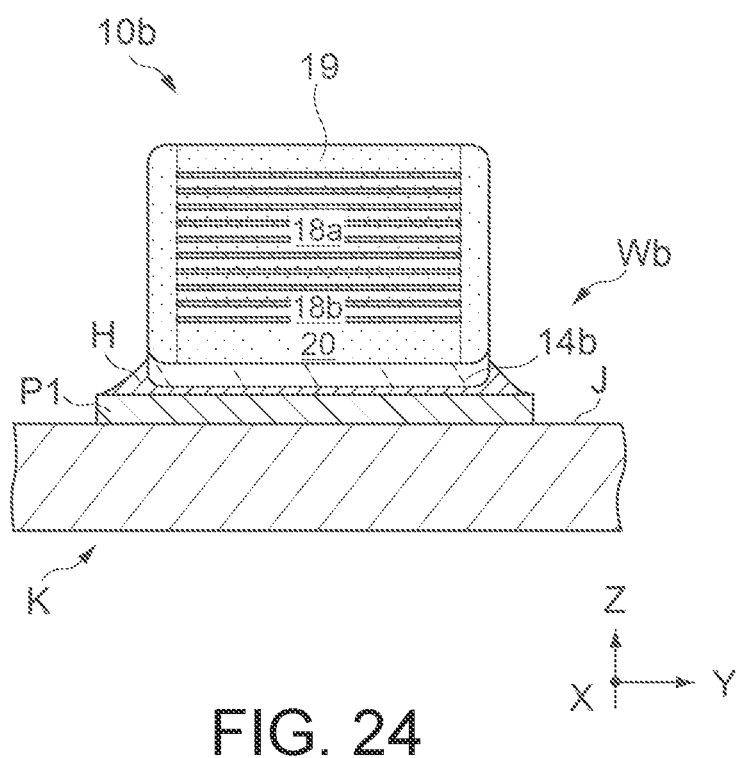
FIG. 24 is a partial cross-sectional view of the component mounting substrate mounting the multilayer ceramic capacitor of Embodiment 3.

FIGS. 23 and 24 are partial cross-sectional views of a component mounting substrate Wb mounting the multilayer ceramic capacitor 10b. In the multilayer ceramic capacitor 10b, because the external electrodes 14b and 15b are not arranged on the side surfaces S1 and S2 of the ceramic main body 11, the solders H are not present on the side surfaces S1 and S2.

Therefore, in the multilayer ceramic capacitor 10b, the corrosion due to fluxes contained in the solders H does not progress from the side surfaces S1 and S2 of the ceramic main body 11. Thus, in the multilayer ceramic capacitor 10b, there is no need to provide the auxiliary side margin parts 17a, which would provide extra spacings between the internal electrode facing part 21 and the side surfaces S1 and S2.

Accordingly, in the multilayer ceramic capacitor 10b, as shown in FIG. 22, similar to the first functional part 18a, the lateral edges of the internal electrodes 12 and 13 are positioned on the side surfaces s of the laminated body 16. Because of this, the multilayer ceramic capacitor 10b can increase the capacitance by an amount by which the internal electrode facing part 21 is expanded.

On the other hand, in the multilayer ceramic capacitor 10b also, because the solders H are present on areas facing end surfaces E1 and E2, the dimension of the internal electrode facing part 21 along the X-axis in the second functional part 18b is made smaller than that in the first functional part 18a, and the dimension, along the X-axis, of the end margin parts 22 and 23 in the second functional part 18b is greater than that in the first functional part 18a.

In the multilayer ceramic capacitor 10b, the thickness of the protective region is set in the same manner as in Embodiment 2. That is, in the multilayer ceramic capacitor 10b, the total thickness $t_{20}+t_{18b}$ of the cover part 20 and the second functional part 18b that constitute the protective region is greater than the thickness $t_{19}$ of the first cover part 19.

Here, in the multilayer ceramic capacitor 10b also, the total thickness $t_{20}+t_{18b}$ of the protective region is preferably equal to or greater than 2.5 times as large as the dimension $t_R$ of the ridge parts R of the ceramic main body 11, is also preferably equal to or greater than 2 times and equal to or less than 4 times as large as the thickness $t_{19}$ of the first cover part 19, and is preferably equal to or greater than ¹⁄25th and equal to or less than ¹⁄10th of the thickness $t_{11}$ of the ceramic main body 11.

<Manufacture Method for Multilayer Ceramic Capacitor 10b>

Figure 25:
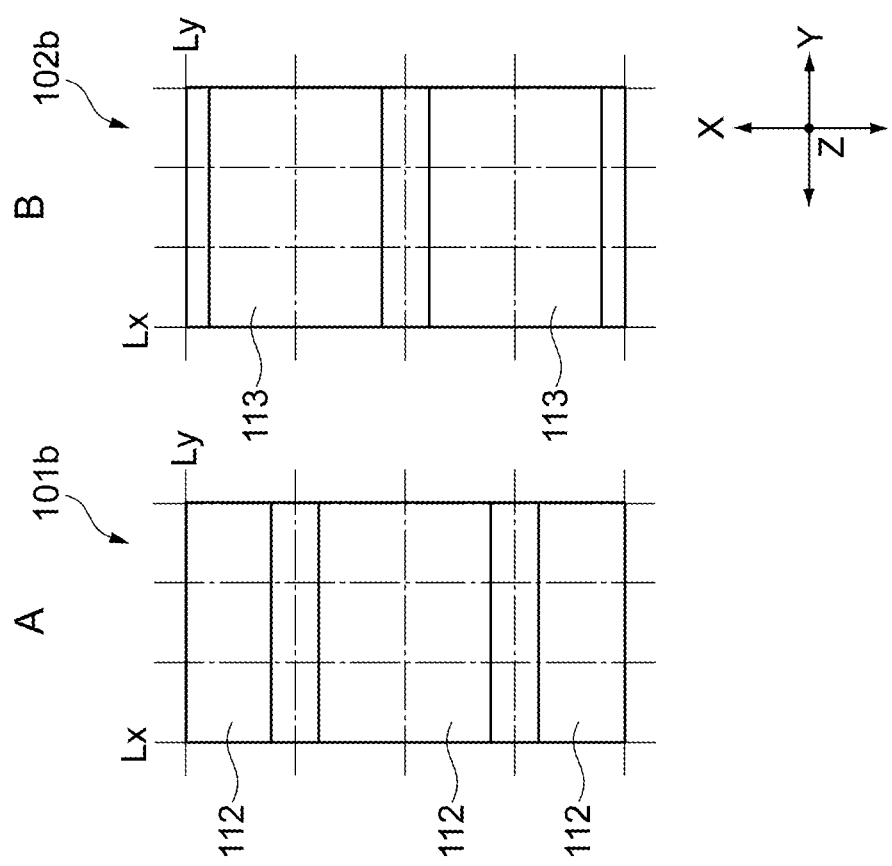
FIG. 25 is a plan view for step S01 of the manufacture method for the multilayer ceramic capacitor of Embodiment 3.
Figure 26:
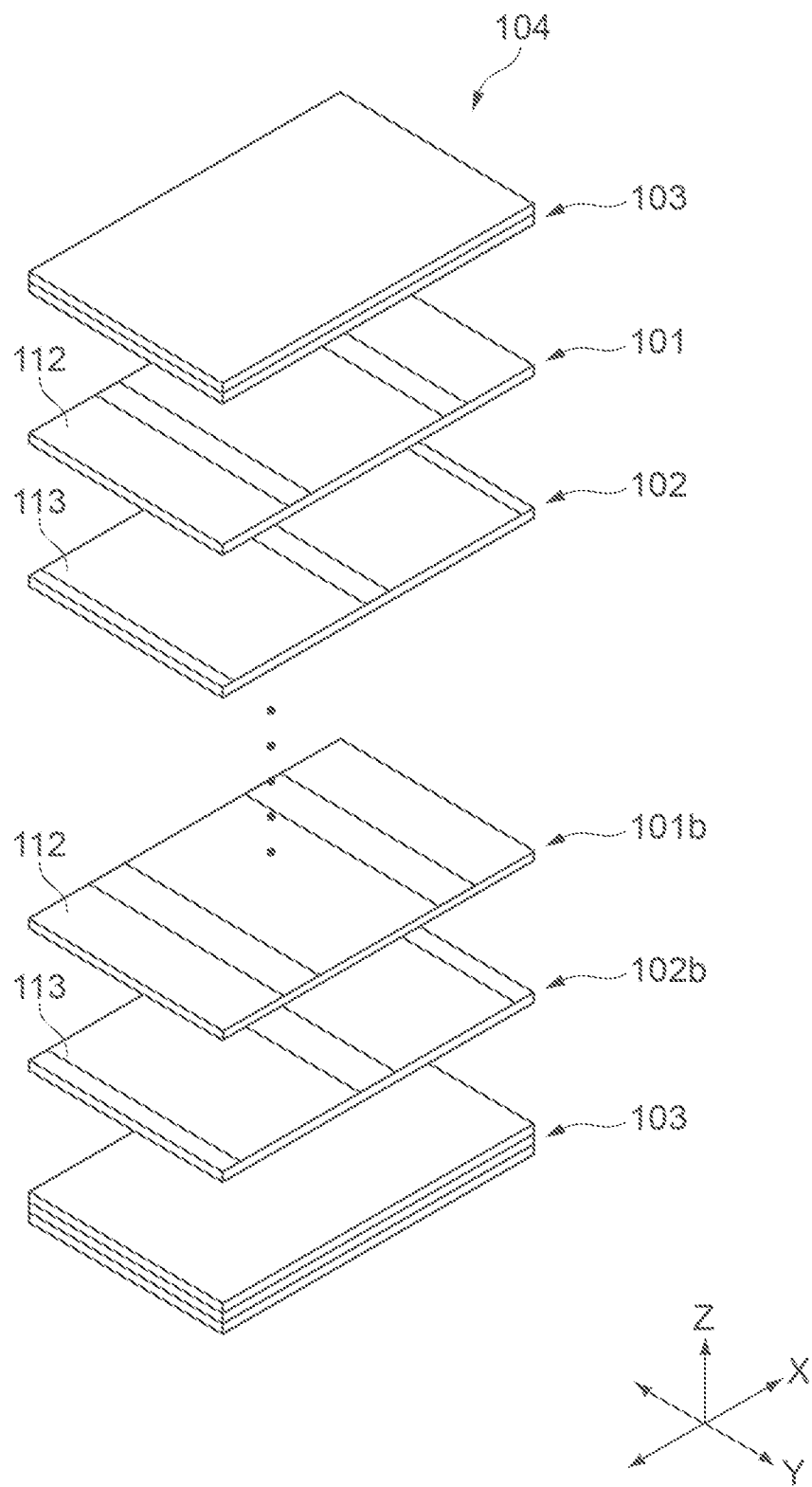
FIG. 26 is a perspective view for step S02 of the manufacture method for the multilayer ceramic capacitor of Embodiment 3.

A method for manufacturing the multilayer ceramic capacitor 10a of the present embodiment differs from the method for manufacturing the multilayer ceramic capacitor 10 shown in FIG. 7 with respect to only steps S01, S02, and S06. FIG. 25 shows step S01 of the present embodiment. FIG. 26 shows step S02 of the present embodiment.

At step S01 of the present embodiment, ceramic sheets 101*b* and 102*b* for forming the second functional part 18*b* shown in FIG. 25 are formed. On the ceramic sheets 101*b* and 102*b*, the patterns of the internal electrodes 112 and 113 differ from those on the ceramic sheets 101*a* and 102*a* of Embodiment 2.

Specifically, in the ceramic sheets 101*b* and 102*b*, in the internal electrodes 112 and 113, spaces that run along the cutting lines Lx for forming the auxiliary side margin 17*a* in Embodiment 2 are not formed. On the other hand, in the ceramic sheets 101*b* and 102*b*, the spaces that run along the cutting lines Ly in the internal electrodes 112 and 113 are arranged in the same way as in Embodiment 2.

At step S02 of the present embodiment, as shown in FIG. 26, the ceramic sheets 101 and 102 are laminated to form the first functional part 18*a*, and the ceramic sheets 101*b* and 102*b* are laminated to form the second functional part 18*b* so as to form the laminated sheets 104 having the structure corresponding to the structure of the multilayer ceramic capacitor 10*b*.

At step S06 of the present embodiment, the external electrodes 14*b* and 15*b* having the L-shape cross sections, as shown in FIGS. 20 and 21, are formed. To form the external electrodes 14*b* and 15*b*, a sputtering method can be used, for example. By using the sputtering method, the external electrodes 14*b* and 15*b* can be formed so as not to extend to the first main surface M1 and to the side surfaces S1 and S2.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

For example, if the second functional part is made smaller in at least one of the X-direction dimension and the Y-direction dimension, at least some of the above-described advantageous effects can be obtained. For example, in the internal electrode facing part in the second functional part, the Y-direction dimension may be made smaller than that of the first functional part, and the X-direction dimension may be the same as that in the first functional part.

Further, the present invention is applicable to not only multilayer ceramic capacitors, but also multilayer ceramic electronic devices having a functional part that includes an internal electrode facing part in which a plurality of electrodes face each other in general. Such multilayer ceramic electronic devices include, for example, chip varistors, chip thermistors, multilayer inductors, etc.

What is claimed is:

1. A method of making a multilayer ceramic electronic device, comprising:
    forming first ceramic sheets respectively covered with first conductive patterns, second ceramic sheets respectively covered with second conductive patterns, and third ceramic sheets, the second conductive patterns having smaller areas than the first conductive patterns,
    laminating the first ceramic sheets with the first conductive patterns, the second ceramic sheets with the second conductive patterns, and the third ceramic sheets in a first direction to form a laminate such that a plurality of the third ceramic sheets, a plurality of the second ceramic sheets, a plurality of the first ceramic sheets, and another plurality of the third ceramic sheets are laminated in that order in the first direction;
    cutting out a laminated body from the laminate, the laminated body having a first cover part cut out from said another plurality of the third ceramic sheets, a second cover part cut out from the plurality of the third ceramic sheets, a plurality of laminated first internal electrodes cut out from the plurality of the first ceramic sheets with the first conductive patterns, and a plurality of laminated second internal electrodes cut out from the plurality of the second ceramic sheets with the second conductive patterns;
    attaching a pair of side margin parts to a pair of cut side surfaces of the laminated body, respectively, to form a ceramic body having a first main surface facing the first direction, a second main surface facing an opposite direction of the first direction, a pair of side surfaces facing a second direction perpendicular to the first direction and an opposite direction of the second direction, respectively, and a pair of end surfaces facing a third direction perpendicular to the first and second directions and an opposite direction of the third direction, respectively, the first main surface being formed by the first cover part, the second main surface being formed by the second cover part, the pair of side surfaces being formed by the pair of side margin parts, respectively, and
    forming a pair of external electrodes respectively covering the pair of end surfaces, the pair of external electrodes respectively extending from the end surfaces to the second main surface,
    wherein the laminating to form the laminate includes:
        positioning the first conductive pattern of each of the first ceramic sheets such that after carrying out the cutting out of the laminated boy, each of first overlap areas between the first internal electrodes has the same shape and the same dimension in a plan view as seen from the first direction, and
        positioning the second conductive pattern of each of the second ceramic sheets such that after carrying out the cutting out of the laminated boy, each of second overlap areas between the second internal electrodes is positioned inside of the first overlap areas between the first internal electrodes along at least one of the second and third directions in the plan view.

2. The method according to claim 1,
wherein the forming of the first to third ceramic sheets, the laminating to form the laminate, and the cutting out of the laminated body are carried out such that in the cut out laminated body, side edges of each of the first internal electrodes in the second direction are positioned at the pair of cut side surfaces of the laminated body, respectively, and that side edges of each of the second internal electrodes in the second direction are positioned inside the pair of cut side surfaces of the laminated body.

3. The method according to claim 2,
wherein the forming of the first to third ceramic sheets, the laminating to form the laminate, and the cutting out of the laminated body are carried out such that in the cut out laminated body, a dimension of the second overlap areas between the second internal electrodes is smaller than a dimension of the first overlap areas between the first internal electrodes along the third direction in the plan view.

4. The method according to claim 2,
wherein the forming of the pair of external electrodes includes forming the pair of external electrodes so as to extend to the pair of side surfaces, respectively.

5. The method according to claim 1,
wherein the forming of the first to third ceramic sheets, the laminating to form the laminate, and the cutting out of the laminated body are carried out such that in the cut out laminated body, side edges of each of the first internal electrodes are positioned at the pair of cut end surfaces of the laminated body respectively, that side edges of each of the second internal electrodes are positioned at the pair of cut end surfaces of the laminated body, respectively, and that a dimension of the second overlap areas between the second internal electrodes is smaller than a dimension of the first overlap areas between the first internal electrodes along the third direction in the plan view.

6. The method according to claim 5,
wherein the forming of the pair of external electrodes includes forming the pair of external electrodes so as not to contact the pair of side surfaces.

7. The method according to claim 1, wherein the laminating of the first ceramic sheets, the second ceramic sheets, and the third ceramic sheets is carried out such that a distance, along the first direction, between the second main surface and the first internal electrode that is the closest to the second main surface among the plurality of the first internal electrodes is greater than a distance, along the first direction, between the first main surface and the first internal electrode that is the closest to the first main surface among the plurality of the first internal electrodes.

\* \* \* \* \*